(12) United States Patent
Digmann et al.

(10) Patent No.: US 9,003,724 B2
(45) Date of Patent: Apr. 14, 2015

(54) WEATHER BARRIER APPARATUSES FOR SEALING OR SHELTERING VEHICLES AT LOADING DOCKS

(71) Applicants: Charles Digmann, Dubuque, IA (US); David J. Hoffmann, Peosta, IA (US); Gary Borgerding, Dubuque, IA (US)

(72) Inventors: Charles Digmann, Dubuque, IA (US); David J. Hoffmann, Peosta, IA (US); Gary Borgerding, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 14/483,929

(22) Filed: Sep. 11, 2014

(65) Prior Publication Data
US 2015/0007512 A1 Jan. 8, 2015

Related U.S. Application Data

(62) Division of application No. 13/933,848, filed on Jul. 2, 2013.

(51) Int. Cl.
*E04D 13/18* (2014.01)
*E04H 14/00* (2006.01)
*B65G 69/00* (2006.01)

(52) U.S. Cl.
CPC .............. *B65G 69/008* (2013.01); *E04H 14/00* (2013.01)

(58) Field of Classification Search
USPC ............. 52/173.1, 173.2, 2.11, 2.12
See application file for complete search history.

(56) References Cited

U.S. PATENT DOCUMENTS

| | | | |
|---|---|---|---|
| 3,322,132 A | 5/1967 | Rieder et al. | |
| 3,403,489 A | 10/1968 | Frommelt et al. | |
| 3,638,667 A | 2/1972 | Frommelt et al. | |
| 3,792,559 A * | 2/1974 | Frommelt et al. | 52/173.2 |
| RE28,391 E | 4/1975 | Frommelt et al. | |
| 3,875,954 A | 4/1975 | Frommelt et al. | |
| 4,213,279 A * | 7/1980 | Layne | 52/173.2 |
| 4,365,452 A * | 12/1982 | Fillman et al. | 52/173.2 |
| 4,381,631 A | 5/1983 | Frommelt | |
| 4,554,768 A | 11/1985 | Srajer | |
| 4,638,612 A | 1/1987 | Bennett | |
| 4,711,059 A | 12/1987 | Layne | |
| 4,799,342 A | 1/1989 | Klevnjans | |
| 4,805,362 A | 2/1989 | Frommelt et al. | |

(Continued)

FOREIGN PATENT DOCUMENTS

WO   WO 02064908 A1 * 8/2002
WO   2013023136   2/2013

OTHER PUBLICATIONS

Frommelt, "Rain Diverter Curtain," published Jul. 1, 1992, 1 page.
(Continued)

*Primary Examiner* — Mark Wendell
*Assistant Examiner* — Keith Minter
(74) *Attorney, Agent, or Firm* — Hanley, Flight & Zimmerman, LLC

(57) ABSTRACT

Example weather barrier apparatuses for sealing or sheltering vehicles at loading docks are disclosed herein. An example apparatus includes a side support member attachable to a wall proximate a doorway. A side seal member extends from the side support member and a rear edge seal is supported by the side seal member. The rear edge seal engages a first rear edge of a vehicle. The rear edge seal has a seal core and a seal cover, where the core has a gap defined by a first portion and a second portion.

20 Claims, 25 Drawing Sheets

(56) References Cited

U.S. PATENT DOCUMENTS

| | | | |
|---|---|---|---|
| 4,825,607 A | | 5/1989 | Frommelt et al. |
| 4,873,800 A | | 10/1989 | Frommelt et al. |
| 5,125,196 A | | 6/1992 | Moody |
| 5,174,075 A | * | 12/1992 | Alten .................. 52/173.2 |
| 5,174,084 A | | 12/1992 | Alten |
| 5,185,977 A | | 2/1993 | Brockman et al. |
| 5,282,342 A | | 2/1994 | Brockman et al. |
| 5,341,613 A | | 8/1994 | Brockman et al. |
| 5,394,662 A | | 3/1995 | Giuliani et al. |
| 5,553,424 A | | 9/1996 | Brockman et al. |
| 5,622,016 A | * | 4/1997 | Frommelt et al. ........... 52/173.2 |
| 5,775,044 A | * | 7/1998 | Styba et al. ............... 52/173.2 |
| 5,953,868 A | | 9/1999 | Giuliani et al. |
| 6,205,721 B1 | | 3/2001 | Ashelin et al. |
| 6,233,885 B1 | | 5/2001 | Hoffmann et al. |
| 6,425,214 B1 | | 7/2002 | Boffeli et al. |
| 6,854,224 B2 | * | 2/2005 | Thill et al. ................. 52/173.2 |
| 7,185,463 B2 | | 3/2007 | Borgerding |
| 7,882,663 B2 | * | 2/2011 | Borgerding ............... 52/173.2 |
| 8,307,588 B2 | | 11/2012 | Hoffmann et al. |
| 8,458,960 B2 | * | 6/2013 | Digmann et al. ........... 52/2.12 |
| 2004/0261335 A1 | | 12/2004 | Eungard |
| 2006/0026912 A1 | | 2/2006 | Eungard et al. |
| 2006/0032159 A1 | | 2/2006 | Eungard et al. |
| 2006/0272222 A1 | * | 12/2006 | Hoffmann et al. ............ 52/2.12 |
| 2007/0283636 A1 | | 12/2007 | Bernacki et al. |
| 2015/0007511 A1 | | 1/2015 | Digmann et al. |
| 2015/0007513 A1 | | 1/2015 | Digmann et al. |

OTHER PUBLICATIONS

Frommelt, "Weather-Guard Dock Shelters Model 402," published May 2001, 2 pages.

International Searching Authority, "The Written Opinion of the International Searching Authority," issued in connection with corresponding International Patent Application No. PCT/US2014/044087, mailed Oct. 28, 2014 (7 pages).

International Searching Authority, "The International Search Report," issued in connection with corresponding International Patent Application No. PCT/US2014/044087, mailed Oct. 28, 2014 (6 pages).

The United States Patent and Trademark Office, "Notice of Allowance," issued in connection with U.S. Appl. No. 13/933,848, on Dec. 1, 2014 (68 pages).

The United States Patent and Trademark Office, "Notice of Allowance," issued in connection with U.S. Appl. No. 14/483,956, on Dec. 4, 2014 (56 pages).

The United States Patent and Trademark Office, "Supplemental Notice of Allowance," issued in connection with U.S. Appl. No. 13/933,848, on Jan. 14, 2015 (8 pages).

* cited by examiner

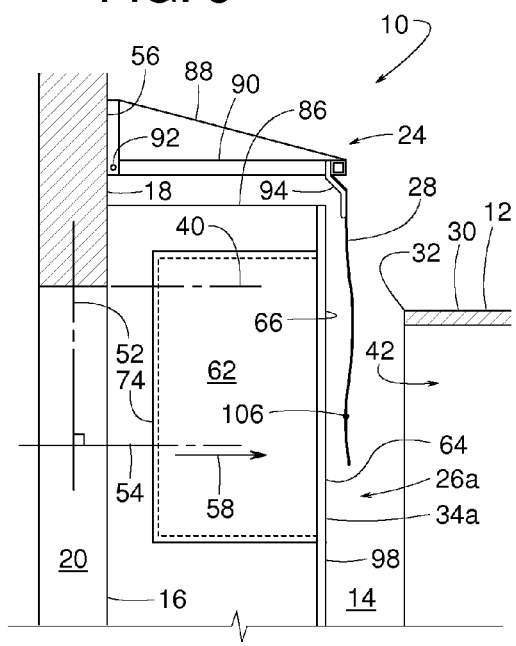
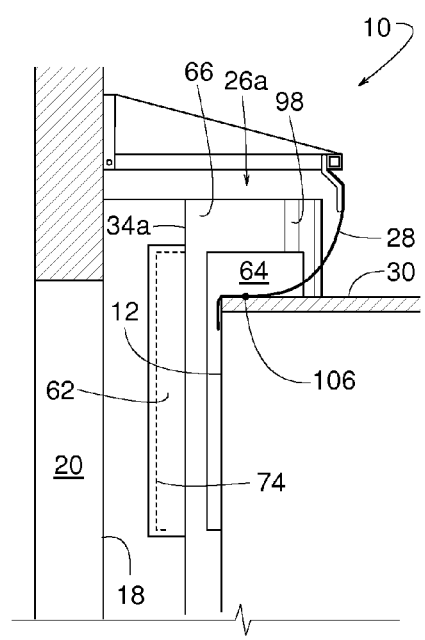
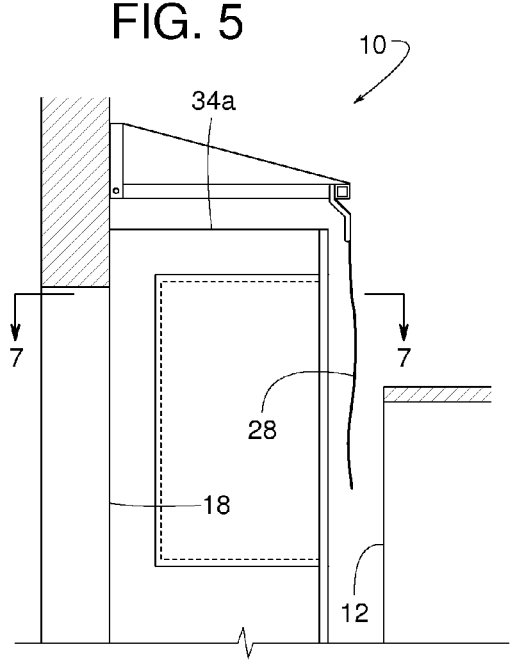
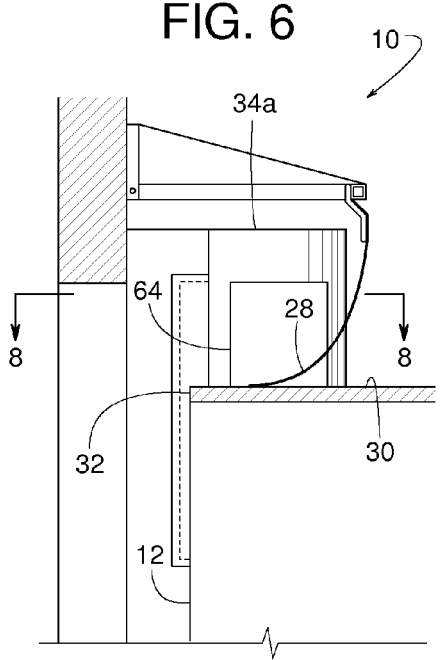

WEATHER BARRIER APPARATUSES FOR SEALING OR SHELTERING VEHICLES AT LOADING DOCKS

CROSS-REFERENCE TO RELATED APPLICATIONS

The patent arises from a divisional of U.S. patent application Ser. No. 13/933,848, filed on Jul. 2, 2013, entitled "Weather Barrier Apparatuses for Sealing or Sheltering Vehicles at Loading Docks," which is incorporated herein by reference in its entirety.

FIELD OF THE DISCLOSURE

The present disclosure relates generally to vehicle-actuated seal members and more specifically to weather barrier apparatuses for sealing or sheltering vehicles at loading docks.

BACKGROUND

Dock weather barriers (weather barrier apparatus), such as dock seals and dock shelters, address the need to prevent the ingress of outdoor environmental conditions or contaminants (e.g., rain, snow, wind, hot/cold temperatures, insects, animals, etc.) into the interior of a building and cargo area of a vehicle during the loading or unloading of the vehicle. Dock shelters and seals also address the need to prevent the egress of conditioned air from within a building and/or a vehicle cargo area to the outdoor environment. Examples of dock seals and/or shelters with various header structures and side structures are disclosed in U.S. Pat. Nos. 6,205,721; 6,233,885; 7,185,463 and 8,307,588.

Some known dock seals use side members having a compressible foam core or body surrounded by a coated fabric or vinyl outer layer. The foam core provides sufficient structural rigidity to enable the side members to be extended a short distance from the building wall surrounding the loading dock. The coated fabric outer layer protects the foam core from outdoor environmental conditions (e.g., moisture), provides wear resistance to repeated impacts from the rear portions of vehicles, and may provide desirable aesthetic qualities. Additionally, a header structure may span between and/or above the side members and is installed along a top portion of the loading dock opening. The header structure may be another compressible member similar in construction to the side members and, in some cases, may include a weighted fabric curtain that hangs downwardly to contact the top of a truck trailer to form an environmental barrier along the top of the trailer.

Another type of dock seal uses inflatable side members and a header structure having internal compressible resilient pads, which provide some degree of side member compressibility when the side members are in a deflated condition. In either case, when the rear portion of a vehicle (e.g., a truck trailer) is backed into either foam or inflatable dock seal side and header members, the side and header members are compressed toward the building wall to form a seal along the lateral and top back edges of the vehicle. If present, the head curtain sweeps along the top of the trailer to form a seal at the top of the trailer between the side members. Dock seals typically consume a relatively small amount of wall space and can provide a relatively high quality seal between the rear edges of a vehicle and the outside building wall surrounding the dock. However, when the dock seal side members are compressed, they may be displaced into or otherwise encroach on the opening to the rear of the docked vehicle. As a result, the compressed side member may interfere with operation of a fork lift and/or an operator during loading and unloading activities. In addition, inflatable dock seals are susceptible to power losses and tears that compromise the ability of the side members to inflate to provide an acceptable seal.

In contrast to dock seals, some known dock shelters use side members that are mounted to the outside building wall surrounding the loading dock. The side members are spaced well to the outside of the sides of a docked vehicle. The side members are configured to extend (i.e., to be cantilevered) an appreciable distance from the outside building wall, particularly in cases where a dock leveler protrudes from the dock opening. The side members may also support flexible seal members or side curtains extending inwardly from the side members across at least a portion of the opening defined by the side members. When a vehicle such as, for example, a truck trailer, is backed into the opening of the dock shelter, the inwardly facing edges of the seal members or side curtains resiliently deflect and sweep against the lateral sides of the trailer to form an environmental barrier therebetween. As with dock seals, dock shelters also typically include a header structure, which may include a head curtain, to form an environmental barrier along the top edge of the rear of the vehicle.

In contrast to dock seals, dock shelters typically provide unobstructed access to a vehicle cargo area opening (i.e., there are no foam pads or the like to be compressed and displaced into the opening). However, most known dock shelter side members are constructed using rigid wood, fiberglass or metal frames capable of supporting the significant weight of the seal members or side curtains, which are usually held at an appreciable distance (e.g., several feet) from the building wall. Such side members may be permanently deformed if they are impacted by a vehicle. Accordingly, bumpers or stops may be mounted to the lower edge of the dock shelter to prevent a vehicle (e.g., a truck trailer) from impacting and damaging the rigid shelter.

The rigid side members used to implement these known dock shelters are also typically mechanically coupled via the header and/or another rigid member to provide increased lateral rigidity to the dock shelter to minimize the ability of the side members to move from side-to-side. Because of this, the side members typically have to be mounted relatively far apart to accommodate a wide range of possible off-center vehicle positions. This relatively large distance between the rigid side members consumes a significant and, thus, expensive amount of building wall space for each loading dock opening.

More recently, dock shelters having impactable side members have been developed. The impactable side members are similar to those used with dock seals and typically use a foam core or body surrounded by a coated fabric outer layer. Seal members or side curtains, which may be constructed using a fabric and flexible fiberglass stays combination or a foam core and fabric combination, are typically mounted to the side members to extend at least partially across the shelter opening. When a vehicle is backed into the shelter, the inwardly facing edges of the seal members or side curtains deflect and sweep against the sides of the vehicle to form an environmental barrier or seal against the sides of the vehicle. In the event the off-center position of a vehicle results in the rear of the vehicle impacting a side member, the foam core or body of the side member is resiliently compressed. When the vehicle is pulled away from an impacted side member, the foam core of the side member causes the side member to substantially recover to its original condition or shape.

The areas of a loading dock shelter where the side seal members and the header's upper seal member meet and interact can cause sealing and wear problems. In some instances, a relatively stiff head curtain or other header sealing member will interfere with the side seal member's ability to seal along the vehicle's rear edge, near the roof of the vehicle. Because the upper seal member of a header structure is generally wider than the widest truck, the upper seal member overlaps the upper portion of the side seal members. As the vehicle pushes the lower edge of the header's upper seal member back towards the dock, the lower corners of the header's upper seal member will contact and push the face of the side seal member away from the side of the vehicle, thereby preventing a good seal in that area. There can also be excessive wear on the portion of the upper seal member that overlaps the side seal member. As the vehicle backs in and penetrates the weather barrier apparatus, the header's upper seal member can be pinched and dragged between the vehicle and the side seal members. This often causes premature wear on the side seal members.

BRIEF DESCRIPTION OF THE DRAWINGS

FIG. 3 is a cross-sectional view taken along line 3-3 of FIG. 1.

FIG. 4 is a cross-sectional view taken along line 4-4 of FIG. 2.

FIG. 5 is a cross-sectional view similar to FIG. 3 but showing a lower vehicle.

FIG. 6 is a cross-sectional view similar to FIG. 5 but showing the example weather barrier apparatus in an activated configuration.

DETAILED DESCRIPTION

Example weather barrier apparatuses for sealing or sheltering a vehicle at a loading dock are disclosed herein. Examples include a horizontally elongate upper seal member for sealing against the vehicle's roof and two vertically elongate side seal members for sealing against the sides and/or rear edges of the vehicle. The upper seal member is longer than the widest anticipated vehicle, and the side seal members are taller than the highest vehicle, so opposite ends of the upper seal member overlap the upper ends of the side seal members at two upper corners of some weather barrier apparatuses. Near these corners, each side seal member has an opening or pocket that provides room for the opposite ends of the upper seal member to pass through or penetrate the side seal members. Some side seal members have a hook-style rear edge seal with a slot for accommodating the vehicle's upper rear edge.

Figure 1:
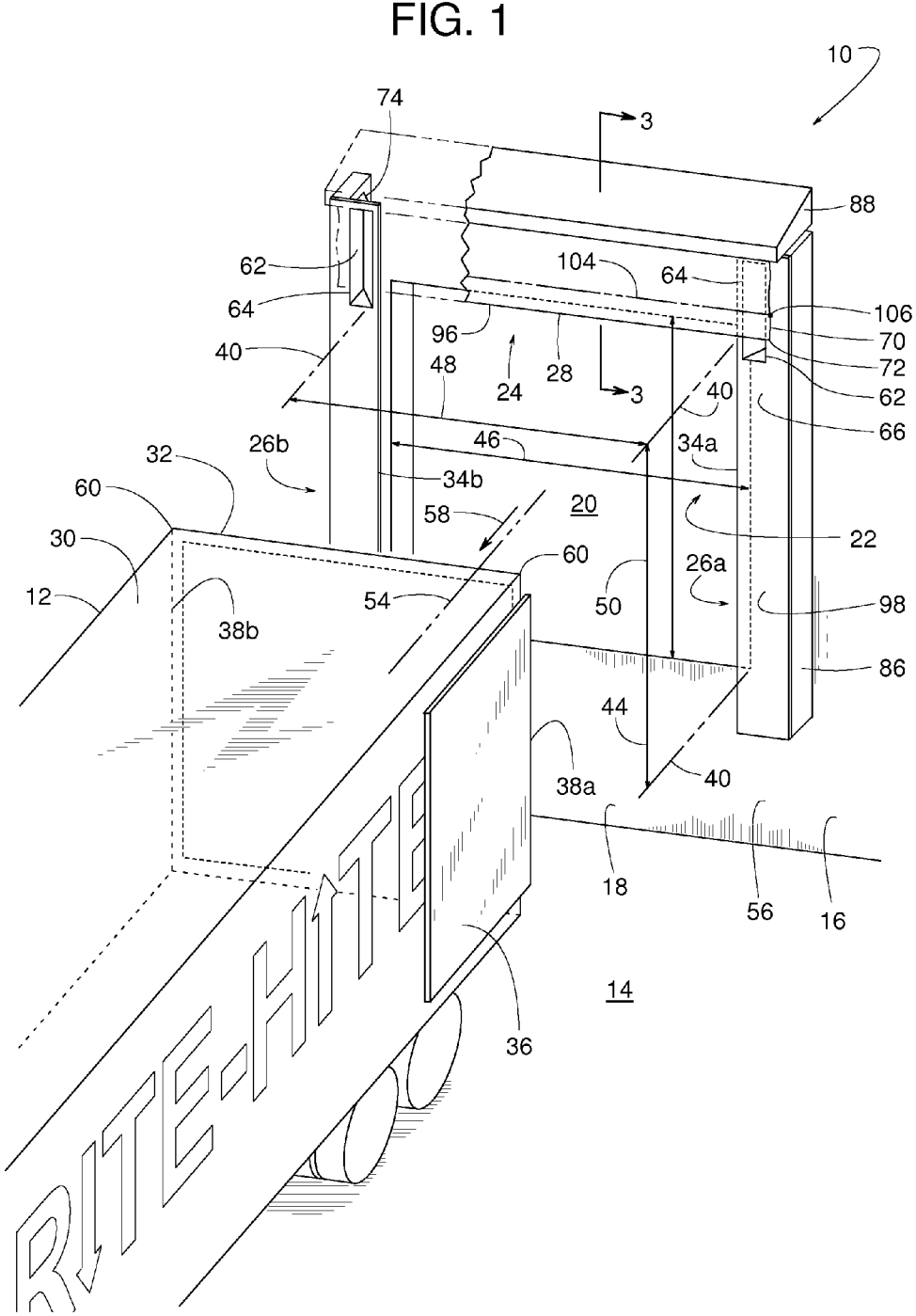
FIG. 1 is a partial cutaway perspective view of an example weather barrier apparatus constructed in accordance with the teachings disclosed herein. The weather barrier apparatus is shown in a relaxed configuration with a vehicle at a departed position.
Figure 62:
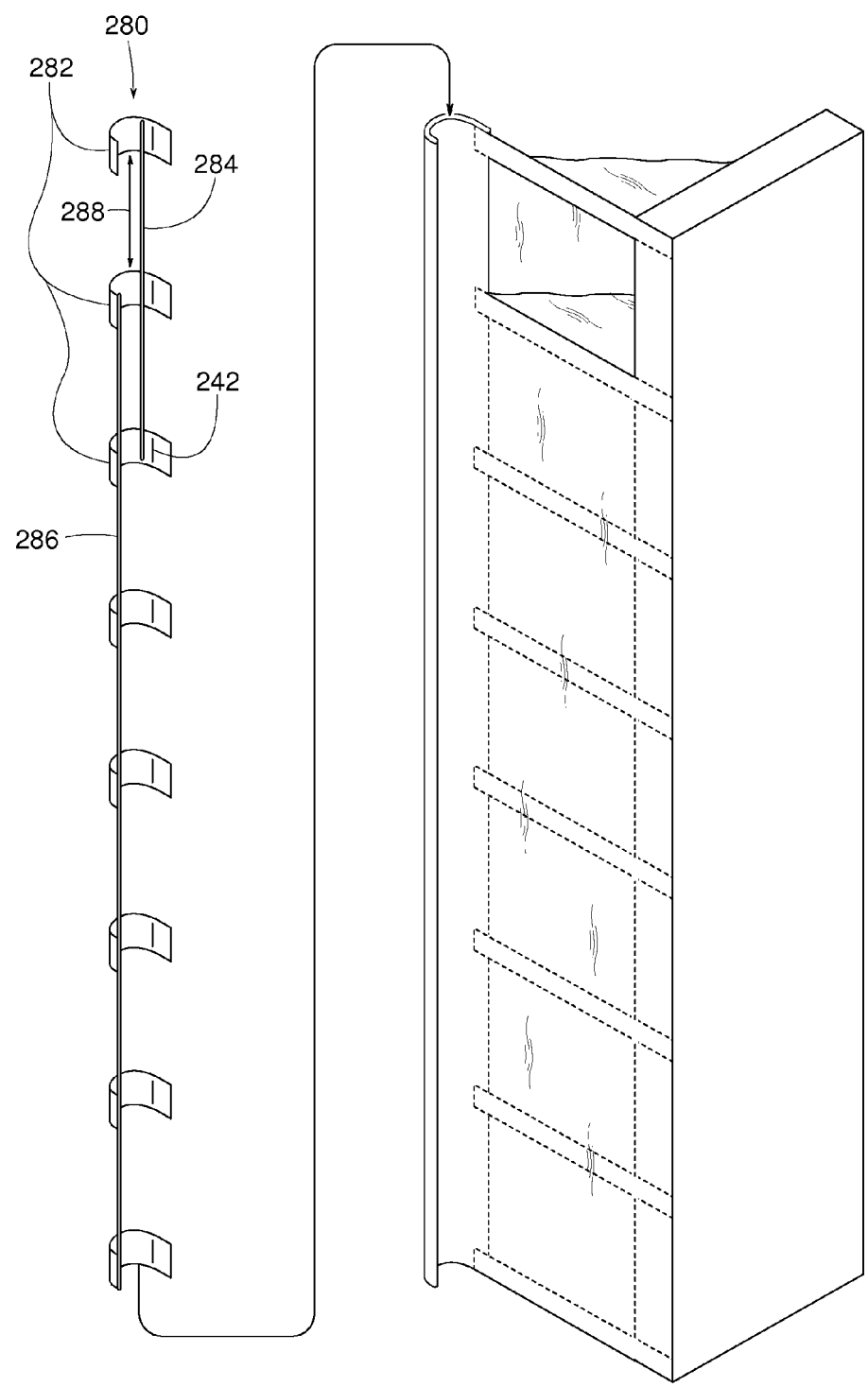
FIG. 62 is an exploded perspective view similar to FIG. 54 but showing another example of a seal core constructed in accordance with the teachings disclosed herein.

FIGS. 1-62 show an example weather barrier apparatus 10 and examples of its various alternatives, modifications and components for sealing or sheltering a vehicle 12 (e.g., truck, trailer, etc.) parked at a loading dock 14 of a building 16. Building 16 includes a wall 18 and a doorway 20 through which cargo is transferred between vehicle 12 and an interior dock area 22 of building 16. Weather barrier apparatus 10 and its alternatives are configurable selectively to a relaxed configuration separated from vehicle 12 (e.g., FIGS. 1, 3, 5, 7, 22, 24, 26, 28, 30, 32, 34, 36, 38, 40, 42, 44, 47, 50, 52, 57, 58, 63, and 64) and an activated configuration engaging vehicle 12 (e.g., FIGS. 2, 4, 6, 8, 23, 25, 27, 29, 31, 33, 35, 37, 39, 41, 43, 46, 49, 51 and 53). When separated from the weather barrier apparatus, vehicle 12 is in a departed position. When fully engaging the weather barrier apparatus (as shown in FIGS. 2, 4, 6, 8, 23, 25, 27, 29, 31, 33, 35, 37, 39, 41, 43, 46, 49, 51 and 53) vehicle 12 is in a parked position.

In some examples, weather barrier apparatus 10 includes a generally horizontally elongate header structure 24 proximate the top of doorway 20 and two generally vertically elongate side structures 26a and 26b proximate the side edges of doorway 20. Header structure 24 includes an upper seal member 28 for sealing against a roof 30 and/or an upper rear edge 32 of vehicle 12, and side structures 26a and 26b include side seal members 34a and 34b, respectively, for sealing against a side panel 36 and/or for sealing against vertical rear edges 38a and 38b of vehicle 12. Examples of side panel 36 include, but are not limited to, an outward facing surface of an open rear door and a sidewall of a trailer or truck. In some examples, side structure 26b and side seal member 34b are mirror images of their respective side structure 26a and side seal member 34a, so descriptions of side structure 26a and side seal member 34a apply to their mirror-image counterparts as well.

When weather barrier apparatus 10 in the activated configuration is sealing or sheltering vehicle 12 in the parked position, cargo can be transferred along a cargo passageway 40 between vehicle 12 and building 16. Cargo passageway 40 is defined as a projection of doorway 20 leading to a rear access opening 42 (FIG. 3) in vehicle 12, wherein cargo passageway 40 has a passageway height 44 and a passageway width 46 equal to the building's doorway height 50 and width 48, respectively. The doorway's height 50 and width 48 lie along a plane 52 (FIG. 3) that is generally parallel to wall 18. A line 54 perpendicular to plane 52 extends parallel to the general direction along which cargo would normally travel through passageway 40. Wall 18 has an exterior surface 56 facing in a forward direction 58 parallel to line 54. The terms "plane" and "line" means that the plane and the line pertain to geometry as opposed to an actual physical structure.

In some examples, in order to seal vehicles of various widths and heights, side seal members 34a and 34b are taller than the highest anticipated vehicle 12, and upper seal member 28 is horizontally longer than the widest anticipated vehicle 12. Consequently, the ends of upper seal member 28 may overlap side seal members 34a and 34b near the vehicle's upper rear corners 60. To effectively seal against the upper rear corners 60 of vehicle 12 without upper seal member 28 forcefully pressing against, abrading, displacing and thus interfering with side seal member 34a and 34b at those corners, and to effectively seal against the vehicle's vertical rear edge 38a without the vehicle's upper rear edge 32 adversely displacing a hook-style rear edge seal in an area near the vehicle's upper rear corners 60, some examples of side seal members 34a and 34b include features that provide extra clearance in those difficult areas. Examples of such clearance features include a header-receiving chamber or pocket 62 behind side seal member 34a, an opening 64 (e.g., hole, void, space, cavity, etc.) defined by a front panel 66 of side seal member 34a, and/or a special hook-style rear edge seal 68 (e.g., FIGS. 50 and 51). These clearance features function as follows.

As vehicle 12 backs into and deflects seal members 28, 34a and 34b, opening 64 in front panel 66 of side seal member 34a allows a portion of header structure 24 to pass through or penetrate side seal member 34a, rather than displace it adversely. Examples of such a penetrating portion of header structure 24 include, but are not limited to, a lateral edge 70 of upper seal member 28, and a lower corner point 72 or the lowermost corner of upper seal member 28. In some examples, opening 64 leads to header-receiving chamber 62, which is enclosed by a back sheet 74 to prevent air from flowing through opening 64 and bypassing side seal member 34a. In some examples, as shown in FIGS. 50-57, rear edge seal 68 of side seal member 34a is generally vertically elongate from a lower end 76 to an upper end 78 (FIG. 56) and includes a relatively stiff hook-shaped seal core 82 (FIG. 54) encased within a pliable seal cover 80. The hook profile allows rear edge seal 68 to wrap around and seal against the vehicle's vertical rear edge 38a while, in some examples, seal core 82 includes a notch or gap 84 that provides clearance for the vehicle's upper rear edge 32. Seal cover 80 spans gap 84 and is sufficiently pliable to conform and seal around the vehicle's upper rear edge 32 in the area of gap 84.

In the example illustrated in FIGS. 1-8, weather barrier apparatus 10 has its side seal member 34a attached to a side support member 86, which is mounted to wall 18. Side support member 86 is schematically illustrated to represent any structure having any generally horizontal cross-sectional shape that can support side seal member 34a such that side seal member 34a can resiliently flex or move in reaction to vehicle 12 backing into weather barrier apparatus 10. In some examples, side support member 86 is made of a resiliently compressible polyurethane foam core encased within a pliable or flexible sheet of material (e.g., encased within a vinyl coated fabric).

In the example shown in FIGS. 1-8, upper seal member 28 is in the form of a flexible curtain suspended from an upper support member 88 of header structure 24. In some examples, upper support member 88 includes a frame 90 attached to wall 18. In some examples, frame 90 is pivotal about a pin 92 (FIG. 3), which allows frame 90 to tilt upward in reaction to an exceptionally high vehicle backing into weather barrier apparatus 10. To provide upper seal member 28 with a desirable radius of rotation, a lower hanging bracket 94 connects an upper edge of upper seal member 28 to a front end of frame 90. To protect frame 90 and bracket 94 from vehicular impact, some examples of bracket 94 are more resiliently flexible than frame 90 so that bracket 94 can deflect rather than bracket 94 or frame 90 permanently bending or breaking upon being struck by a vehicle.

FIGS. 1-8 show how the lowermost corner point 72 of the seal member's lower edge 96 can pass through opening 64 and protrude into header-receiving chamber 62. FIGS. 1, 3, 5 and 7 show vehicle 12 approaching weather barrier apparatus 10 while upper seal member 28 and side seal member 34a extend into cargo passageway 40. In some examples, when weather barrier apparatus 10 is in the relaxed configuration, a front surface 98 on front panel 66 of side seal member 34a faces generally in a forward direction away from doorway 20. FIGS. 2, 4, 6 and 8 show vehicle 12 having deflected side seal member 34a such that side seal member 34a seals against the vehicle's side panel 36 and/or the vehicle's vertical rear edge 38a. In some examples, at least some portions of front surface 98 become curved as vehicle 12 deflects side seal member 34a. FIGS. 2, 4, 6 and 8 also show vehicle 12 having deflected upper seal member 28 such that upper seal member 28 seals against the vehicle's roof 30 and/or against the vehicle's upper rear edge 32. When weather barrier apparatus 10 is in its activated configuration, the side seal member's front surface 98 engages vehicle 12 and faces away from the upper seal member's lower corner point 72, i.e., corner point 72 is now behind the side seal member's front surface 98. FIGS. 5-8 show vehicle 12 being at a lower elevation and traveling closer to wall 18 than what is shown in FIGS. 3 and 4. In some examples, such differences can determine where seal members 28 and 34a seal against vehicle 12.

Figure 7:
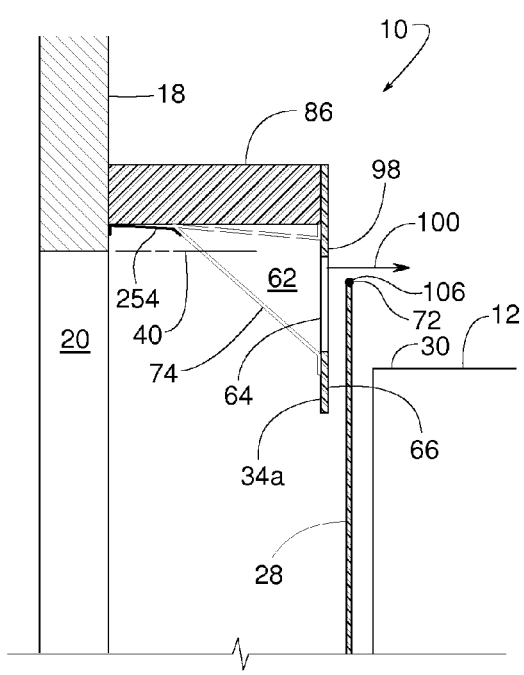
FIG. 7 is a cross-sectional view taken along line 7-7 of FIG. 5.
Figure 8:
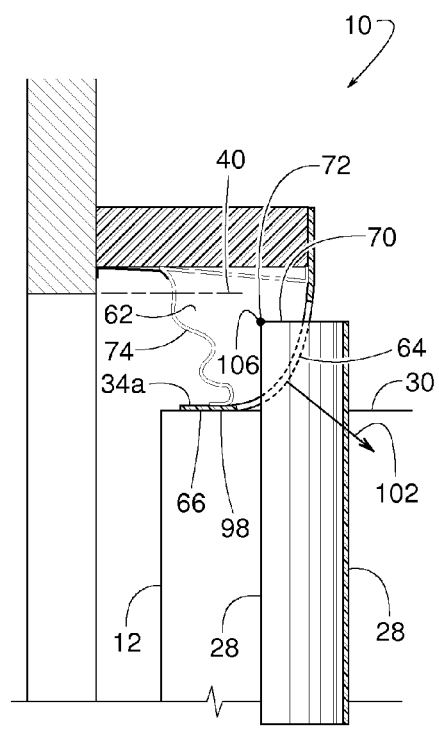
FIG. 8 is a cross-sectional view taken along line 8-8 of FIG. 6.

FIG. 7 shows opening 64 facing in a first direction 100 when weather barrier apparatus 10 is in the relaxed configuration. And FIG. 8 shows opening 64 facing in a different direction 102 when weather barrier apparatus 10 is in the activated configuration. The change in direction facilitates upper seal member 28 protruding into opening 64 as the side seal member's front panel 66 deflects to place its front surface 98 in sealing contact with vehicle 12. In some examples, to ensure side seal member 34a reaches and sealingly engages vehicle 12, side seal member 34a extends laterally farther into cargo passageway 40 when weather barrier apparatus 10 is in the relaxed configuration (FIG. 7) than when weather barrier apparatus 10 is in the activated configuration (FIG. 8).

Figure 2:
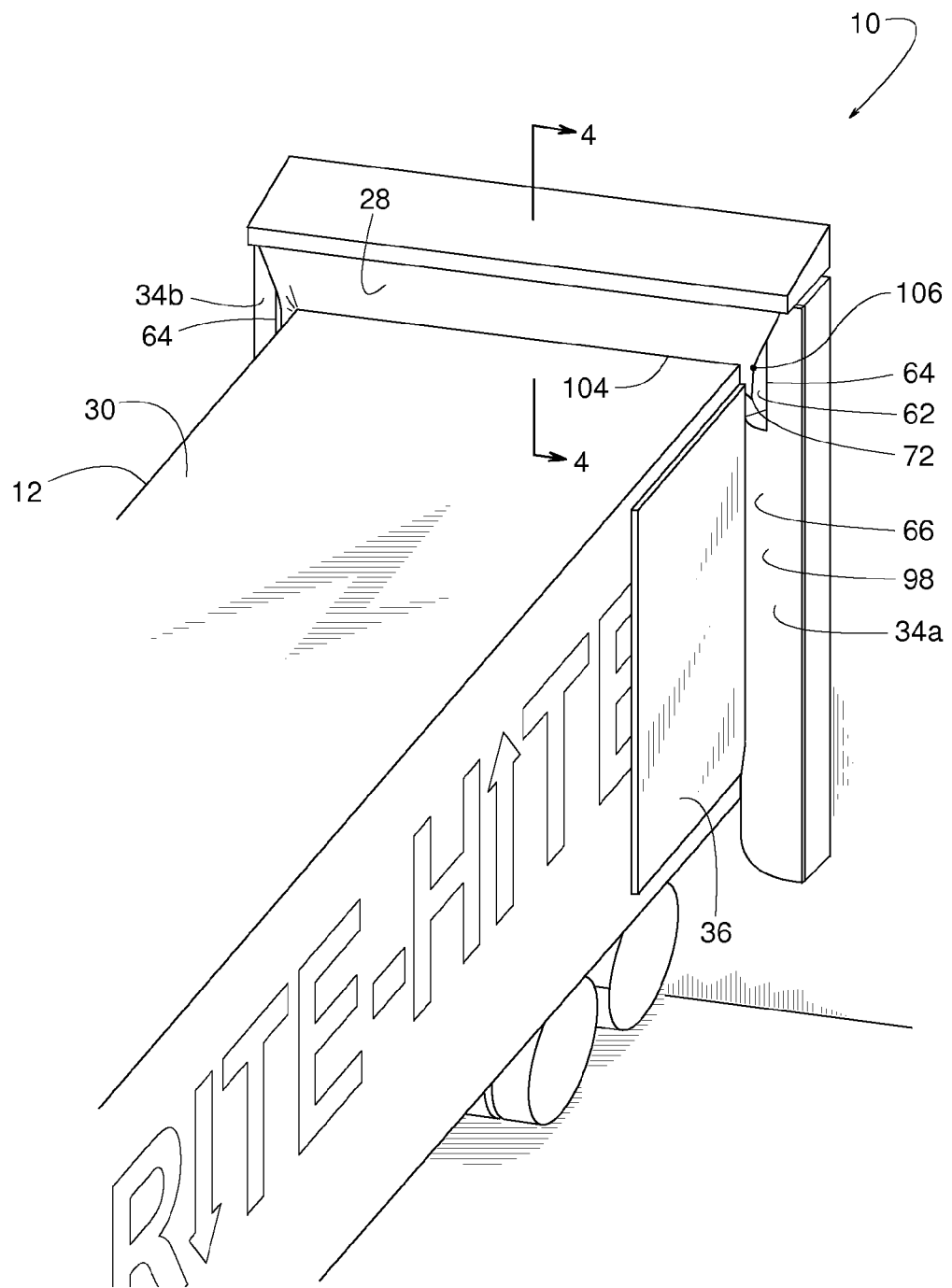
FIG. 2 is a perspective view similar to FIG. 1 but showing the example weather barrier apparatus in an activated configuration with the vehicle in the parked position.

FIGS. 1-4, 7 and 8 also show upper seal member 28 being generally horizontally elongate along a substantially linear line segment 104 terminating at an endpoint 106 on upper seal member 28. Line segment 104 lies along roof 30 when weather barrier apparatus 10 is in the activated configuration with vehicle 12 in the parked position, as shown in FIGS. 2, 4 and 8. Endpoint 106 is spaced apart from roof 30 even when weather barrier apparatus 10 is in the activated configuration with vehicle 12 in the parked position. The seal member's front surface 98, as shown in FIG. 8, faces away from endpoint 106 when weather barrier apparatus 10 is in the activated configuration.

Figure 9:
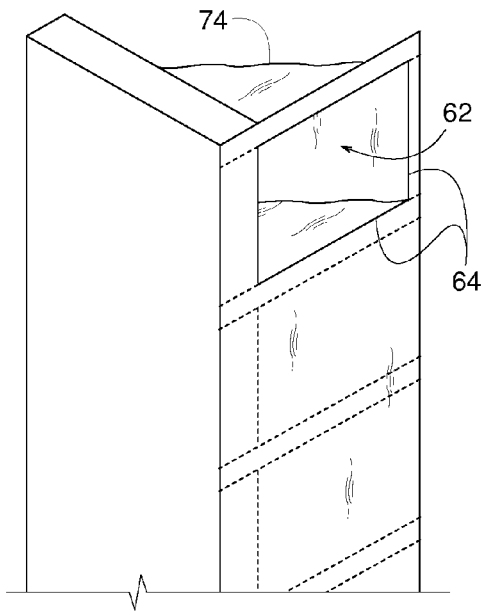
FIG. 9 is a perspective view of an example side structure constructed in accordance with the teachings disclosed herein.
Figure 10:
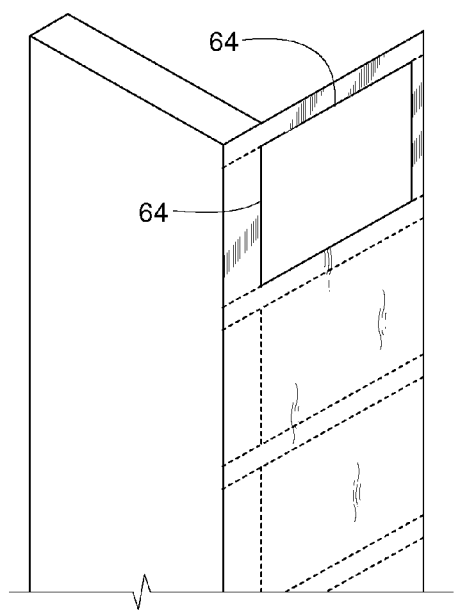
FIG. 10 is a perspective view of another example side structure constructed in accordance with the teachings disclosed herein.
Figure 11:
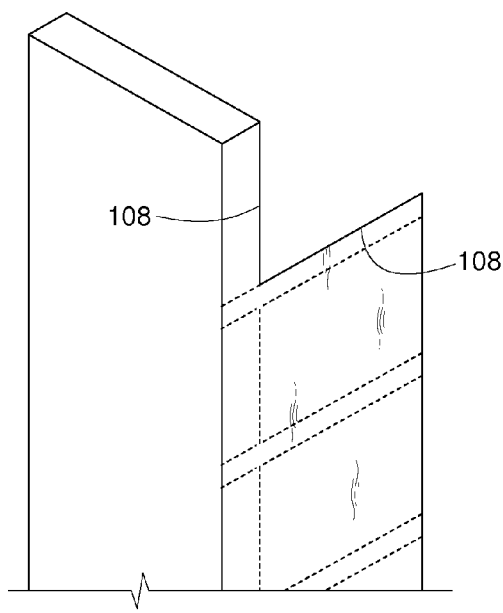
FIG. 11 is a perspective view of another example side structure constructed in accordance with the teachings disclosed herein.
Figure 12:
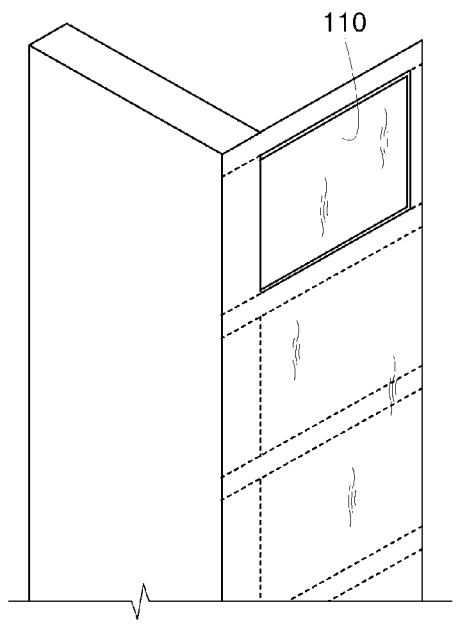
FIG. 12 is a perspective view of an example side structure with an example cover constructed in accordance with the teachings disclosed herein.
Figure 13:
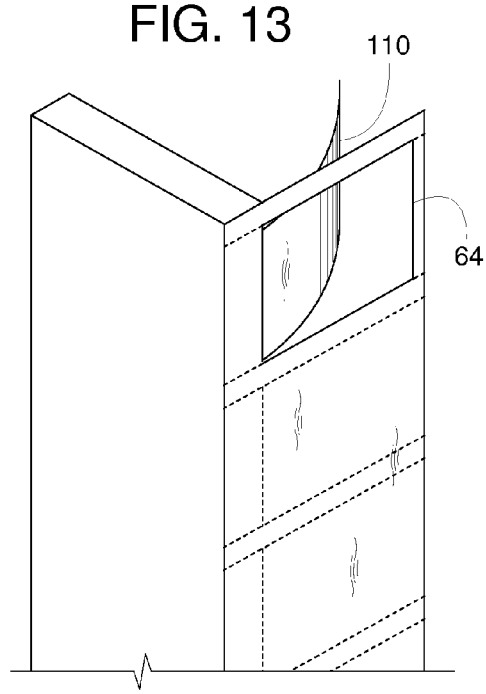
FIG. 13 is a perspective view similar to FIG. 12 but showing the example cover open.
Figure 14:
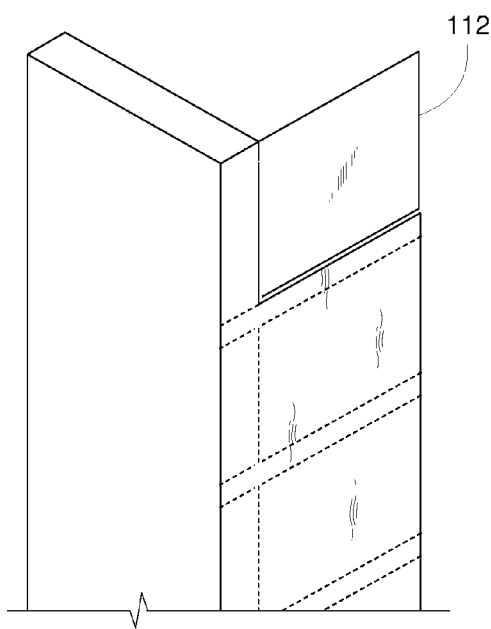
FIG. 14 is a perspective view of another example side structure with another example cover constructed in accordance with the teachings disclosed herein.
Figure 15:
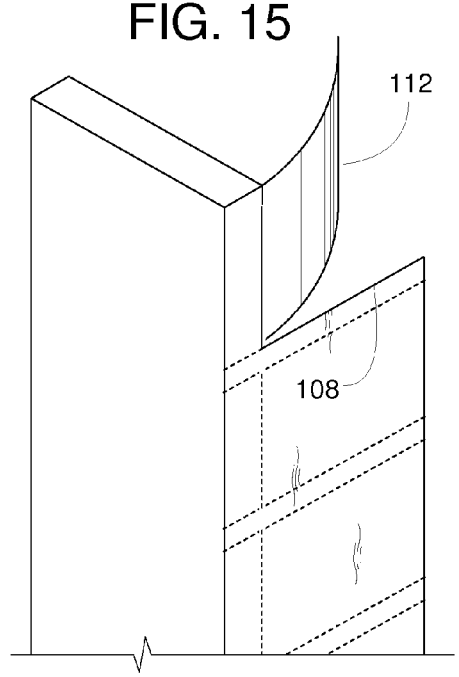
FIG. 15 is a perspective view similar to FIG. 14 but showing the example cover open.
Figure 16:
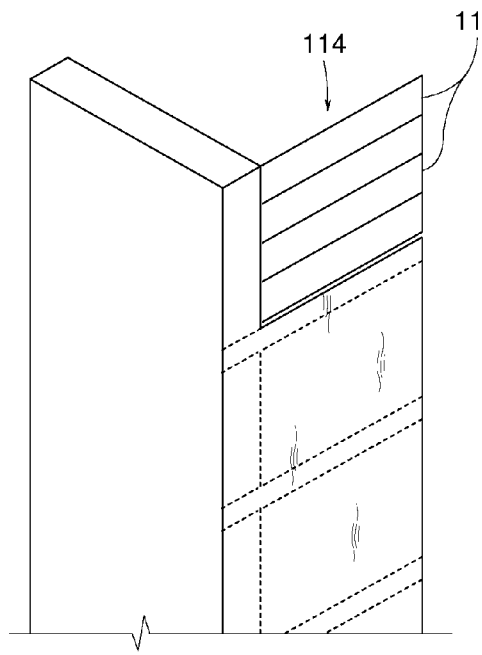
FIG. 16 is a perspective view of another example side structure with another example cover constructed in accordance with the teachings disclosed herein.
Figure 17:
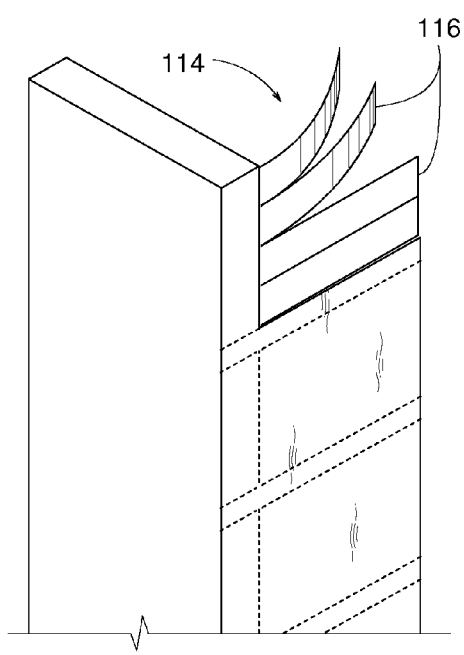
FIG. 17 is a perspective view similar to FIG. 16 but showing the example cover open.
Figure 18:
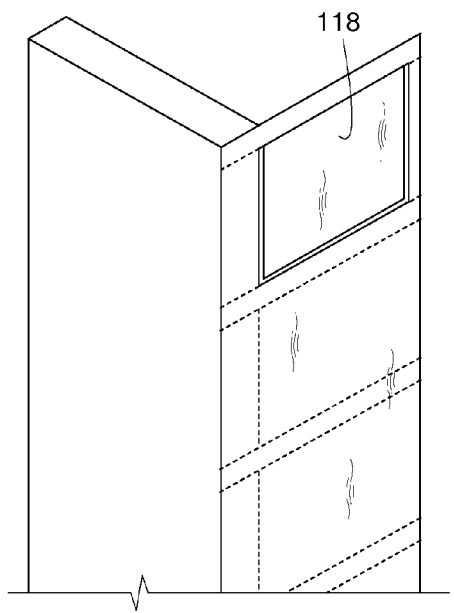
FIG. 18 is a perspective view of another example side structure with another example cover constructed in accordance with the teachings disclosed herein.
Figure 19:
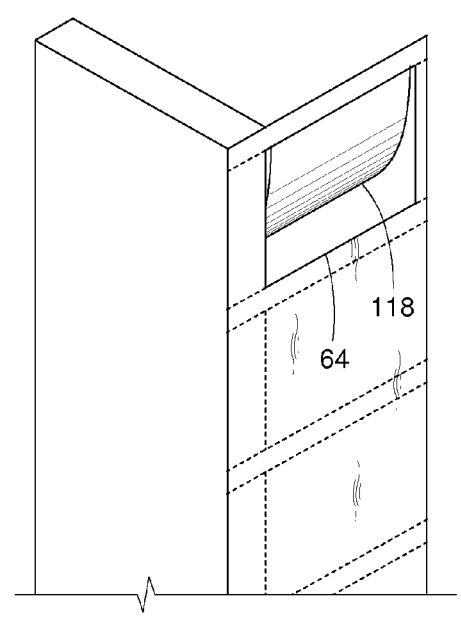
FIG. 19 is a perspective view similar to FIG. 18 but showing the example cover open.
Figure 20:
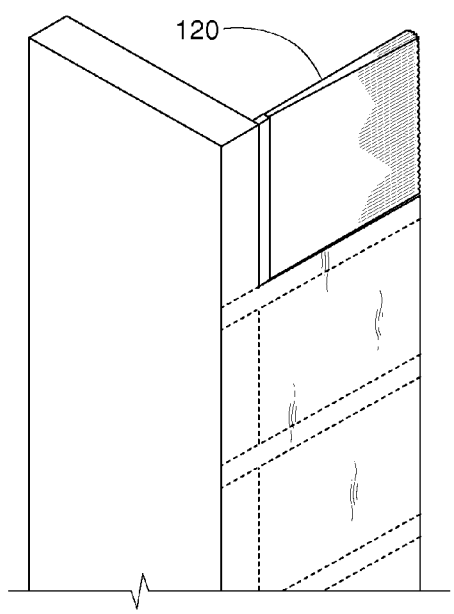
FIG. 20 is a perspective view of another example side structure with another example cover constructed in accordance with the teachings disclosed herein.
Figure 21:
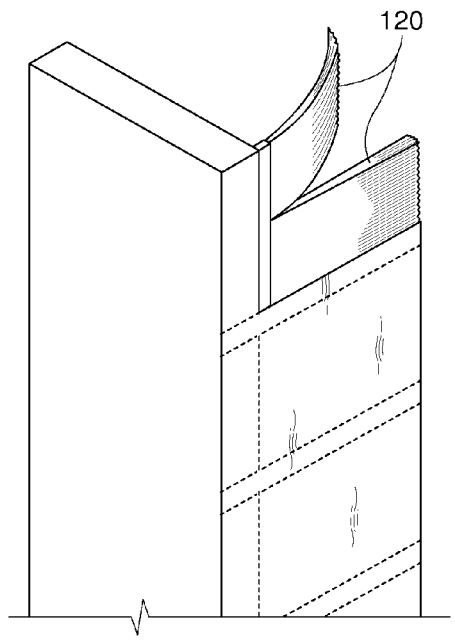
FIG. 21 is a perspective view similar to FIG. 20 but showing the example cover open.

FIGS. 9-25 illustrate various examples of side seal member openings that provide penetrating clearance for an upper seal member's lowermost corner. FIG. 9 shows opening 64 leading to header-receiving chamber 62, wherein back sheet 74 encloses the back end of chamber 62. Header-receiving chamber 62 can be of any shape, examples of which include, but are not limited to, triangular, rectangular, partially spherical, partially cylindrical, irregular, etc. In some examples, a cover (such as the example covers shown in FIGS. 12-25) extends across and obstructs opening 64. In some examples, there is no cover across opening 64, as shown in FIGS. 9 and 10. FIG. 10 further shows opening 64 without enclosed chamber 62. FIG. 11 shows an opening 108 that is not entirely surrounded by a frame. FIGS. 12 and 13 show a horizontally pivotal cover 110 across opening 64, wherein FIG. 12 shows cover 110 in a closed position, and FIG. 13 shows cover 110 in an open position. FIGS. 14 and 15 show a horizontally pivotal cover 112 across opening 108, wherein FIG. 14 shows cover 112 in a closed position, and FIG. 15 shows cover 112 in an open position. FIGS. 16 and 17 show an example cover 114 including a plurality of independently pivotal segments 116. In some examples, a pliable web (not shown) extends between adjacent segments 116 to help prevent air from flowing between segments 116. FIGS. 18 and 19 show a vertically pivotal cover 118 across opening 64, wherein FIG. 18 shows cover 118 in a closed position, and FIG. 19 shows cover 118 in an open position. FIGS. 20 and 21 show a cover 120 including a brush with a plurality of bristles, wherein FIG. 20 shows cover 120 in a closed position, and FIG. 21 shows cover 120 in an open position.

Figure 22:
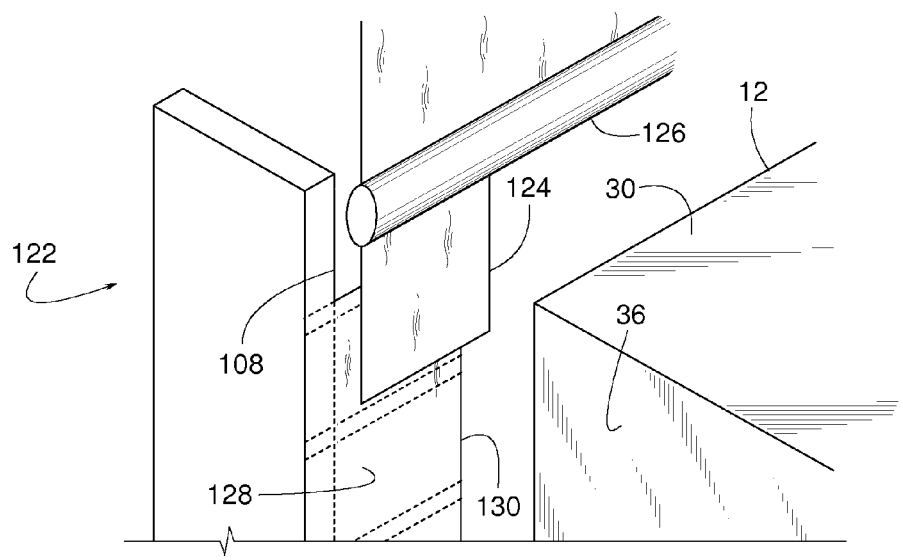
FIG. 22 is a perspective view of an example weather barrier apparatus with an example cover constructed in accordance with the teachings disclosed herein.
Figure 23:
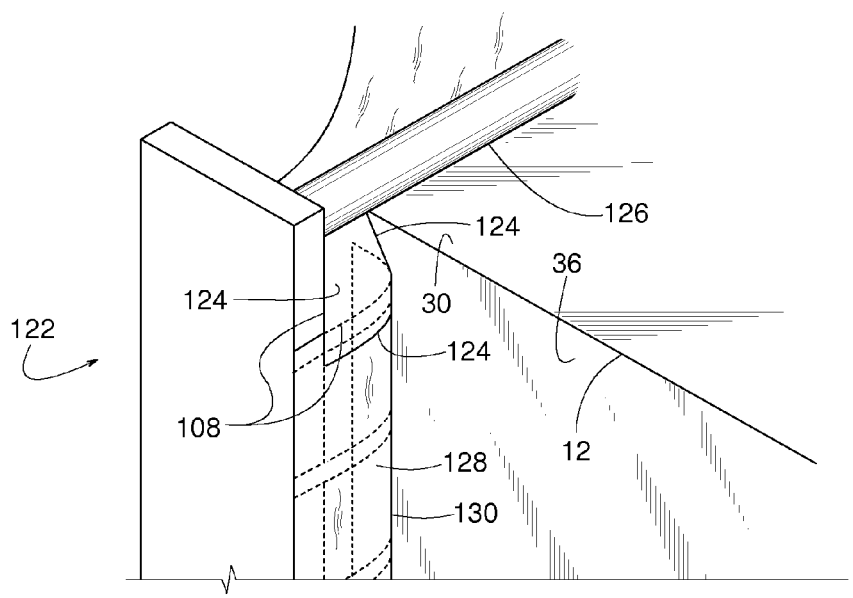
FIG. 23 is a perspective view similar to FIG. 22 but showing the example weather barrier apparatus in an activated configuration.

FIGS. 22 and 23 show an example weather barrier apparatus 122 with a cover 124 extending across opening 108. In this example, cover 124 hangs downward from an example upper seal member 126. As vehicle 12 backs into weather barrier apparatus 122 from the position shown in FIG. 22 to that of FIG. 23, vehicle 12 forces upper seal member 126 up on top of the vehicle's roof 30. Vehicle 12 also forces upper seal member 126 back through opening 108 while cover 124 overhangs and covers opening 108. In the activated configuration shown in FIG. 23, a front surface 128 of a side seal member 130 deflects to seal against the vehicle's side panel 36.

Figure 24:
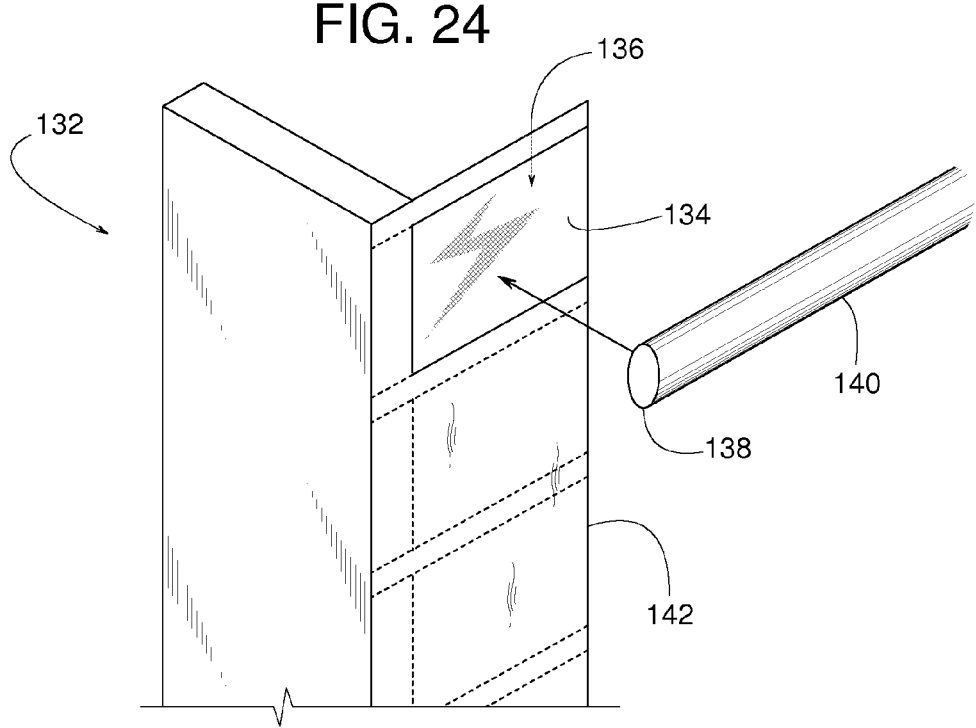
FIG. 24 is a perspective view of an example weather barrier apparatus with an example cover constructed in accordance with the teachings disclosed herein.
Figure 25:
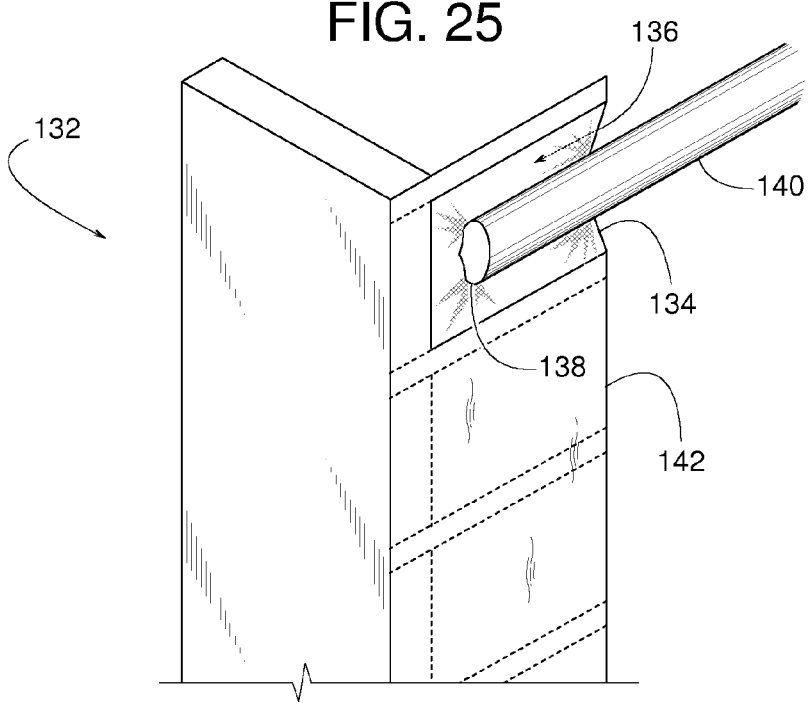
FIG. 25 is a perspective view similar to FIG. 24 but showing the example weather barrier apparatus in an activated configuration.

In the example shown in FIGS. 24 and 25, an example weather barrier apparatus 132 includes a side seal member 142 with a resiliently flexible or otherwise expandable cover 134 extending across and covering or obstructing an opening 136 or an open area behind cover 134. Examples of expandable cover 134 include, but are not limited to, corrugated material, elastic material, latex, etc. When a vehicle backs into weather barrier apparatus 132, the vehicle forces a lower corner point 138 of an example upper seal member 140 back into opening 136 while cover 134 resiliently expands into opening 136, as shown in FIG. 25. Cover 134 remains expanded into opening 136 as the vehicle fully deflects side seal member 142 and forces weather barrier apparatus 132 to its activated configuration (similar to FIG. 39).

Figure 26:
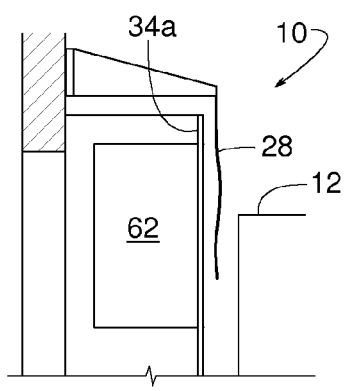
FIG. 26 is a cross-sectional view similar to FIG. 5 but showing less detail.
Figure 27:
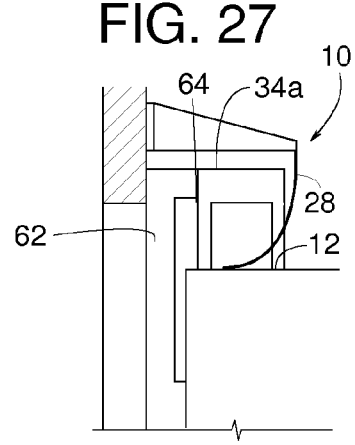
FIG. 27 is a cross-sectional view similar to FIG. 6 but showing less detail.
Figure 28:
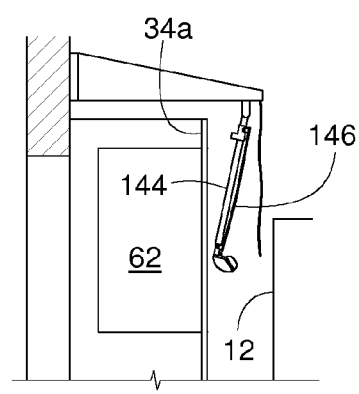
FIG. 28 is a cross-sectional view similar to FIG. 26 but showing an alternate example of a weather barrier apparatus constructed in accordance with the teachings disclosed herein.
Figure 29:
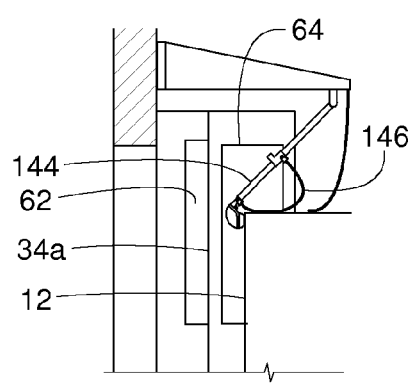
FIG. 29 is a cross-sectional view similar to FIG. 28 but showing the example weather barrier apparatus in an activated configuration.
Figure 30:
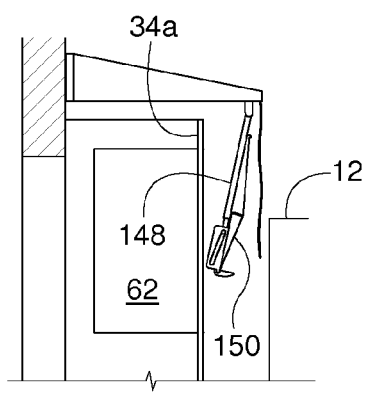
FIG. 30 is a cross-sectional view similar to FIG. 26 but showing another example of a weather barrier apparatus constructed in accordance with the teachings disclosed herein.
Figure 31:
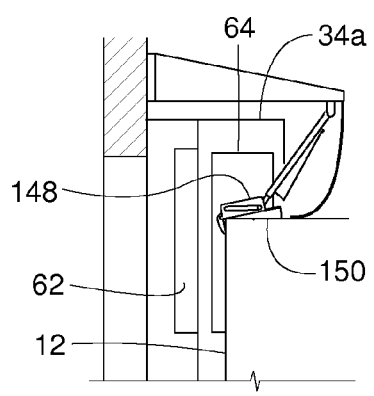
FIG. 31 is a cross-sectional view similar to FIG. 30 but showing the example weather barrier apparatus in an activated configuration.
Figure 32:
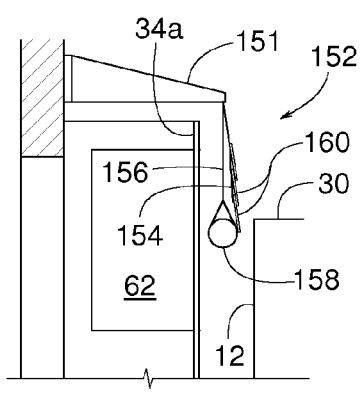
FIG. 32 is a cross-sectional view similar to FIG. 26 but showing another example of a weather barrier apparatus constructed in accordance with the teachings disclosed herein.
Figure 33:
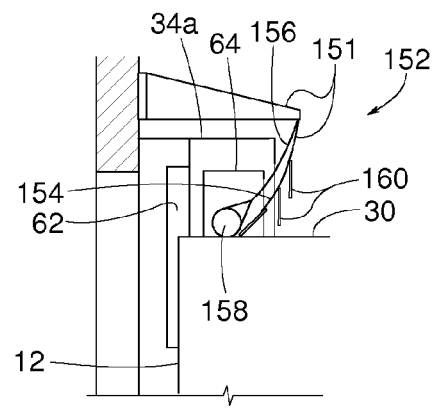
FIG. 33 is a cross-sectional view similar to FIG. 32 but showing the example weather barrier apparatus in an activated configuration.
Figure 34:
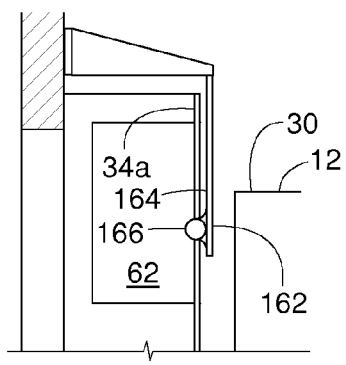
FIG. 34 is a cross-sectional view similar to FIG. 26 but showing another example of a weather barrier apparatus constructed in accordance with the teachings disclosed herein.
Figure 35:
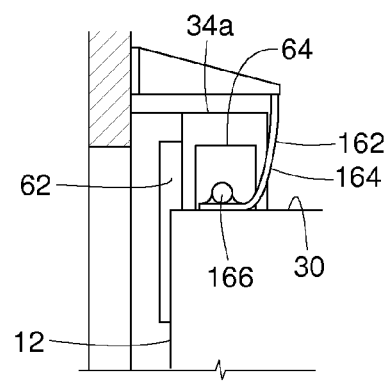
FIG. 35 is a cross-sectional view similar to FIG. 34 but showing the example weather barrier apparatus in an activated configuration.
Figure 36:
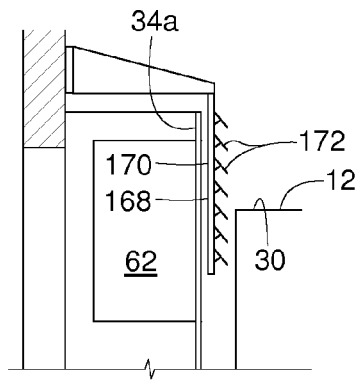
FIG. 36 is a cross-sectional view similar to FIG. 26 but showing another example of a weather barrier apparatus constructed in accordance with the teachings disclosed herein.
Figure 37:
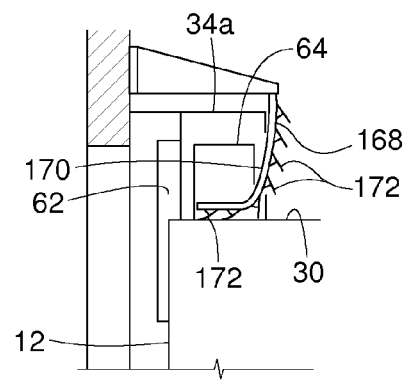
FIG. 37 is a cross-sectional view similar to FIG. 36 but showing the example weather barrier apparatus in an activated configuration.
Figure 38:
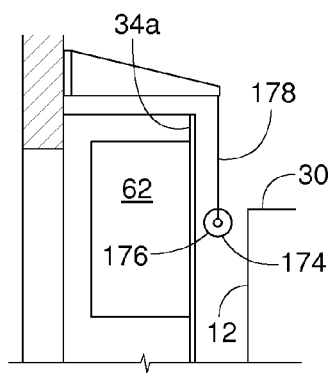
FIG. 38 is a cross-sectional view similar to FIG. 26 but showing another example of a weather barrier apparatus constructed in accordance with the teachings disclosed herein.
Figure 39:
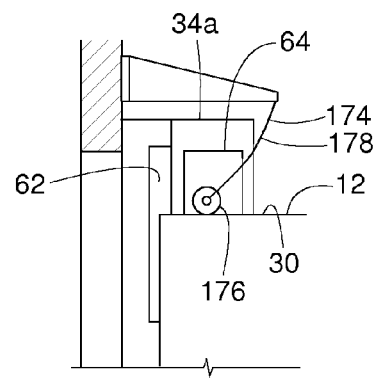
FIG. 39 is a cross-sectional view similar to FIG. 38 but showing the example weather barrier apparatus in an activated configuration.

FIGS. 26-39 show various example header structures with upper seal members each having a lower sealing edge with a lowermost corner that can pass through opening 64 and, if provided with a header-receiving chamber 62, can protrude into chamber 62. FIGS. 26, 28, 30, 32, 34, 36 and 38 show the example weather barrier apparatuses in a relaxed configuration with vehicle 12 approaching but still in a departed position. FIGS. 27, 29, 31, 33, 35, 37 and 39 show the example weather barrier apparatuses in an activated configuration with vehicle 12 in a parked position. The example shown in FIGS. 26 and 27 is basically the same as the example shown in FIGS. 1-8. FIGS. 28 and 29 show an example upper seal member 144 with an expanding bulb seal 146. FIGS. 30 and 31 show an example upper seal member 148 with a compressible rear edge seal 150. FIGS. 32 and 33 show an example header structure 151 with an upper seal member 152 including a front sheet 154 and a back sheet 156. A cylinder 158 hanging from back sheet 156 seals down against the vehicle's roof 30. A plurality of seal segments 160 hanging from front sheet 154 also seal against roof 30, as shown in FIG. 33. FIGS. 34 and 35 show an example upper seal member 162 including a resiliently compressible foam sheet 164 with an added weight 166 that helps push foam sheet 164 tightly down against the vehicle's roof 30. FIGS. 36 and 37 show an example upper seal member 168 including a flexible sheet 170 (e.g., a fabric sheet or a resiliently compressible form sheet) with a plurality of pleats 172 that flex to seal against the vehicle's roof 30. FIGS. 38 and 39 show an example upper seal member 174 including a weighted cylinder 176 hanging from a flexible sheet 178. The weighted cylinder 176 seals down against the vehicle's roof 30, as shown in FIG. 39.

Figure 40:
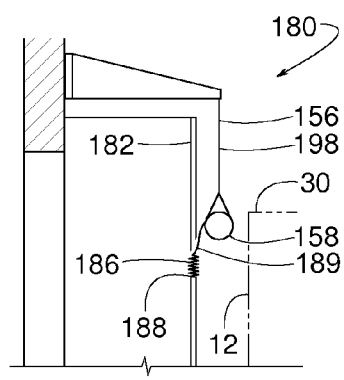
FIG. 40 is a cross-sectional view similar to FIG. 26 but showing another example of a weather barrier apparatus constructed in accordance with the teachings disclosed herein.
Figure 41:
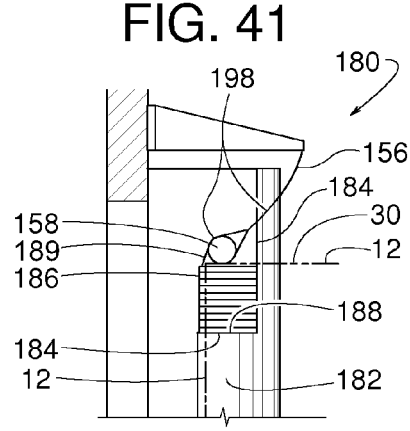
FIG. 41 is a cross-sectional view similar to FIG. 40 but showing the example weather barrier apparatus in an activated configuration.

FIGS. 40-49 show additional example weather barrier apparatuses employing the concept of a header structure having an upper seal member extending into an opening of a side seal member. FIGS. 40 and 41, for instance, show an example weather barrier apparatus 180 including a side seal member 182 that has an opening 184 similar to the opening shown in FIG. 11; however, an expandable cover 186 extends between a lower edge 188 of opening 184 and the lower end of an upper seal member 198, wherein some examples of upper seal member 198 include cylinder 158 and sheet 156. Examples of expandable cover 186 include, but are not limited to, a bellows, elastic sheet of material, sheet wrapped about a spring loaded take-up roller, concertina sheet, folded sheet, corrugated sheet, etc. In this example, cover 186 is normally open when weather barrier apparatus 180 is in its relaxed configuration shown in FIG. 40. As vehicle 12 backs into weather barrier apparatus 180, side seal member 182 deflects to seal against the vehicle's side panel 36 (FIG. 1), and vehicle 12 forces cylinder 158 of an example upper seal member 198 up on top of the vehicle's roof 30, as shown in FIG. 41. Cylinder 158 is longer than the vehicle's width, so the ends of cylinder 158 protrude through opening 184 (similar to FIG. 8). As vehicle 12 forces cylinder 158 on top of roof 30, as shown in FIG. 41, an elastic connection 189 (e.g., elastic cord, elastic fabric, etc.) pulls the upper end of cover 186 up against the bottom of cylinder 158. In some examples, opening 184 has a pair of generally vertical tracks that guide the vertical movement of cover 186.

Figure 42:
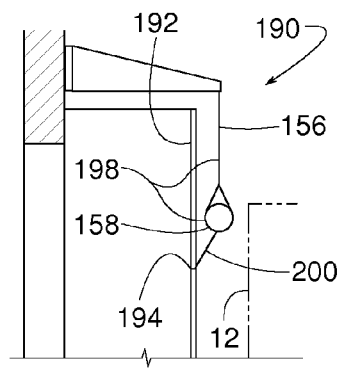
FIG. 42 is a cross-sectional view similar to FIG. 26 but showing another example of a weather barrier apparatus constructed in accordance with the teachings disclosed herein.
Figure 43:
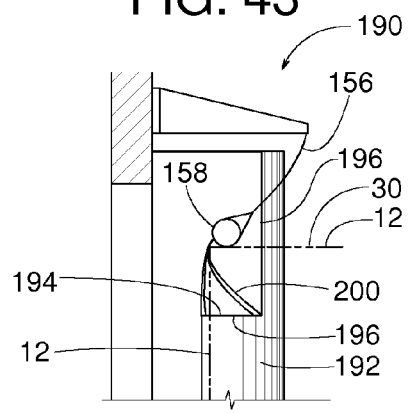
FIG. 43 is a cross-sectional view similar to FIG. 42 but showing the example weather barrier apparatus in an activated configuration.

An example weather barrier apparatus 190 shown in FIGS. 42 and 43 is similar to the example shown in FIGS. 40 and 41; however, weather barrier apparatus 190 has a non-pleated or non-corrugated expandable cover 200 in the form of an elastic sheet that extends between a lower edge 194 of an opening 196 and the lower end of upper seal member 198. As vehicle 12 backs into weather barrier apparatus 190, an example side seal member 192 deflects to seal against the vehicle's side panel 36 (FIG. 1), and vehicle 12 forces cylinder 158 up on top of the vehicle's roof 30. Cylinder 158 is longer than the vehicle's width, so the ends of cylinder 158 protrude through opening 196. As vehicle 12 forces cylinder 158 on top of roof 30, as shown in FIG. 43, cylinder 158 pulls cover 200 up across opening 196 and up against the rear end of vehicle 12.

Figure 44:
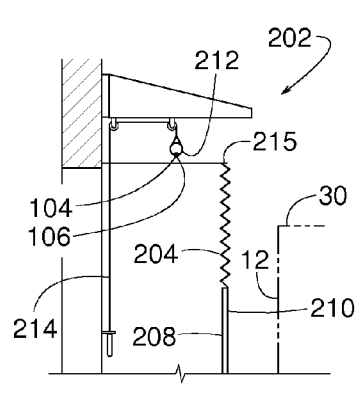
FIG. 44 is a cross-sectional view similar to FIG. 26 but showing another example of a weather barrier apparatus constructed in accordance with the teachings disclosed herein.
Figure 45:
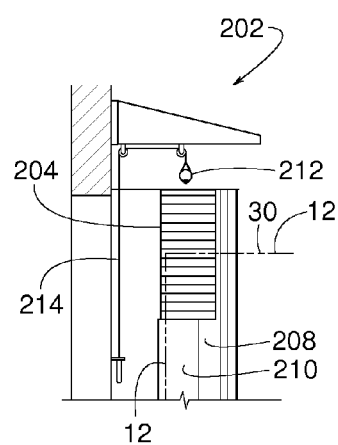
FIG. 45 is a cross-sectional view similar to FIG. 44 but showing the vehicle (in phantom lines) engaging the example weather barrier apparatus.
Figure 46:
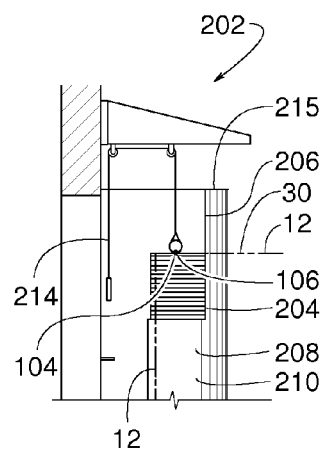
FIG. 46 is a cross-sectional view similar to FIG. 44 but showing the example weather barrier apparatus in an activated configuration.

FIGS. 44-46 show an example weather barrier apparatus 202 including a vertically expandable cover 204 extending across an opening 206 in a side seal member 208. Cover 204, opening 206 and side seal member 208 are similar respectively to cover 186, opening 184 and side seal member 182 shown in FIGS. 40 and 41; however, cover 204 is spring loaded or otherwise biased to the closed position shown in FIGS. 44 and 45. As vehicle 12 backs into weather barrier apparatus 202, as shown in FIG. 45, side seal member 208 deflects such that a front surface 210 of side seal member 208 seals against the vehicle's side panel (e.g., side panel 36 in FIG. 1), as represented in FIG. 45. To seal the vehicle's roof 30, an upper seal member 212 is subsequently lowered from the position shown in FIG. 45 to that of FIG. 46. This places upper seal member 212 in sealing contact with the vehicle's roof 30 and also collapses cover 204 to the position shown in FIG. 46. In some examples, upper seal member 212 is equal or comparable to the upper seal members shown in FIGS. 26, 27 and 38-39. Upper seal member 212 can be raised and lowered by any suitable means, examples of which include, but are not limited to, a manually operated cord 214 movable between a free position (FIG. 46) and an anchored position (FIGS. 44 and 45), a winch, etc.

FIGS. 44-46 also show endpoint 106 and an end view of line segment 104 with respect to upper seal member 212. When weather barrier apparatus 202 is in the relaxed configuration, as shown in FIG. 44, endpoint 106 and line segment 104 are above an uppermost edge 215 of side seal member 208. When weather barrier apparatus 202 is in the activated configuration, as shown in FIG. 46, line segment 104 lies atop roof 30 while endpoint 106 is below the side seal member's uppermost edge 215. Also, when weather barrier apparatus 202 is in the activated configuration, front surface 210 faces away from endpoint 106, just as FIG. 8 shows front surface 98 facing away from endpoint 106.

Figure 47:
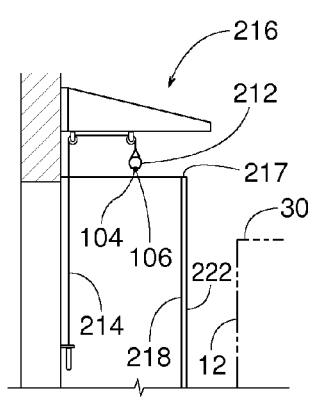
FIG. 47 is a cross-sectional view similar to FIG. 26 but showing another example of a weather barrier apparatus constructed in accordance with the teachings disclosed herein.
Figure 48:
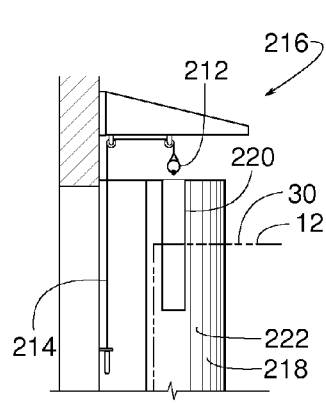
FIG. 48 is a cross-sectional view similar to FIG. 47 but showing the vehicle (in phantom lines) engaging the example weather barrier apparatus.
Figure 49:
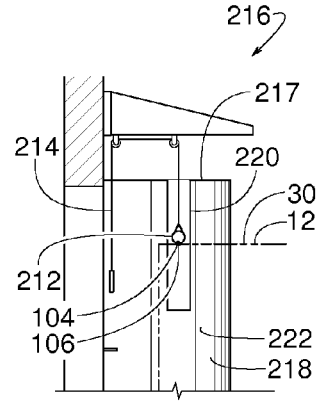
FIG. 49 is a cross-sectional view similar to FIG. 47 but showing the example weather barrier apparatus in an activated configuration.

FIGS. 47-49 show an example weather barrier apparatus 216 including a side seal member 218 with an opening 220 in the form of a slot. In response to vehicle 12 backing into weather barrier apparatus 216 from the position shown in FIG. 47 to the position shown in FIG. 48, side seal member 218 deflects such that a front surface 222 of side seal member 218 seals against the vehicle's side panel (e.g., side panel 36). To seal the vehicle's roof 30, upper seal member 212 (which is longer than the vehicle's width) is subsequently lowered down through opening 220 from the position shown in FIG. 48 to that of FIG. 49. This places upper seal member 212 in sealing contact with the vehicle's roof 30. Upper seal member 212 can be raised and lowered by any suitable means, examples of which include, but are not limited to, manually operated cord 214 movable between a free position (FIG. 49) and an anchored position (FIGS. 47 and 48), a winch, etc.

FIGS. 47-49 also show endpoint 106 and an end view of line segment 104 with respect to upper seal member 212. In some examples, when weather barrier apparatus 216 is in the relaxed configuration, as shown in FIG. 47, endpoint 106 and line segment 104 are above an uppermost edge 217 of side seal member 218. When weather barrier apparatus 216 is in the activated configuration, as shown in FIG. 49, line segment 104 lies atop roof 30 while endpoint 106 is below the side seal member's uppermost edge 217. Also, when weather barrier apparatus 216 is in the activated configuration, front surface 222 faces away from endpoint 106, just as FIG. 8 shows front surface 98 facing away from endpoint 106.

In order to overcome the difficulty of sealing near the vehicle's upper rear corners 60 (FIG. 1), rear edge seals of some example side seal members have a novel hook profile. In some examples, a notch is strategically placed near the upper portion of the hook's core. The notch length and position covers the range of heights of the vehicle roofs expected to be encountered at the loading dock. A pliable cover wraps around the hook's core and connects to the side curtain. While the core of the hook has some flexibility for conforming to the contours of the rear edge of the vehicle, the more flexible pliable cover provides added sealing ability to the hook.

Figure 50:
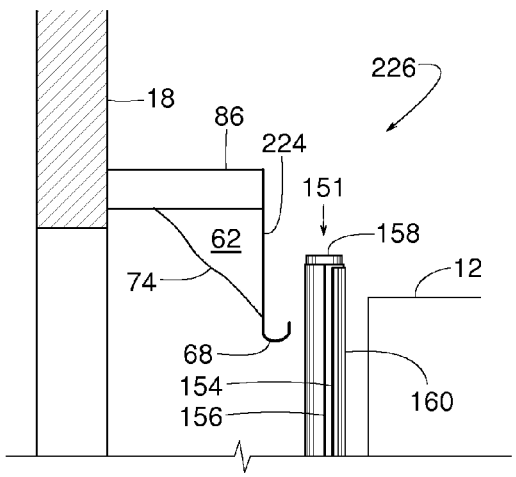
FIG. 50 is a cross-sectional view taken along line 50-50 of FIG. 52.
Figure 51:
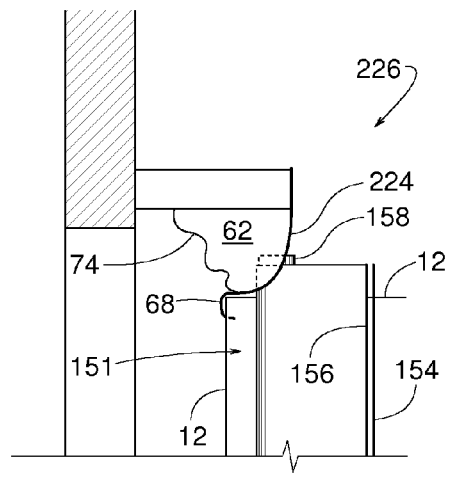
FIG. 51 is a cross-sectional view taken along line 51-51 of FIG. 53.
Figure 52:
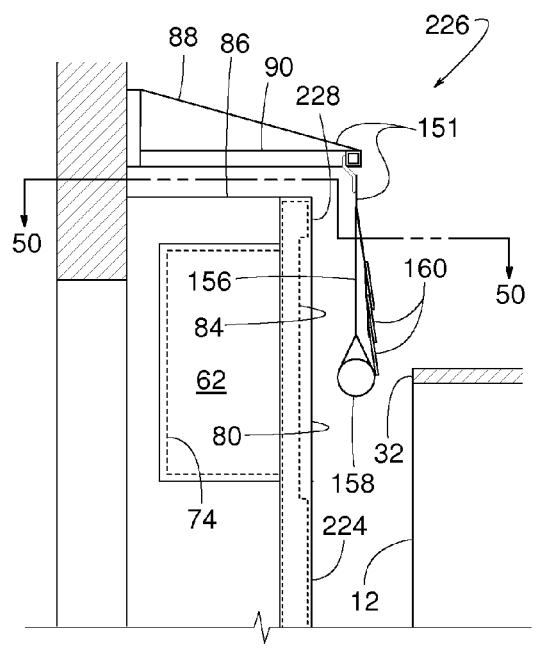
FIG. 52 is a cross-sectional view similar to FIG. 5 but showing another example of a weather barrier apparatus constructed in accordance with the teachings disclosed herein.
Figure 53:
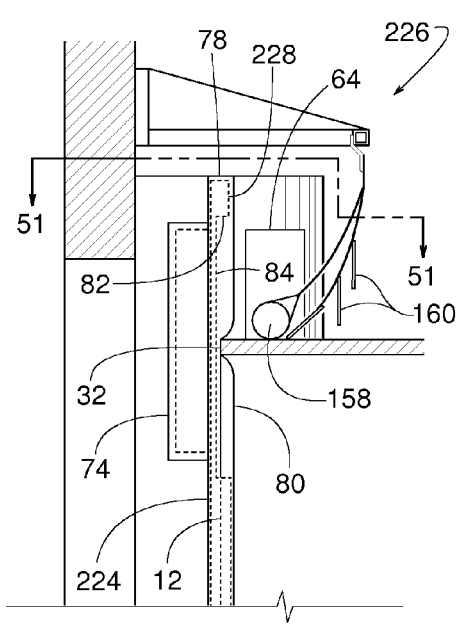
FIG. 53 is a cross-sectional view similar to FIG. 52 but showing the example weather barrier apparatus in an activated configuration.
Figure 54:
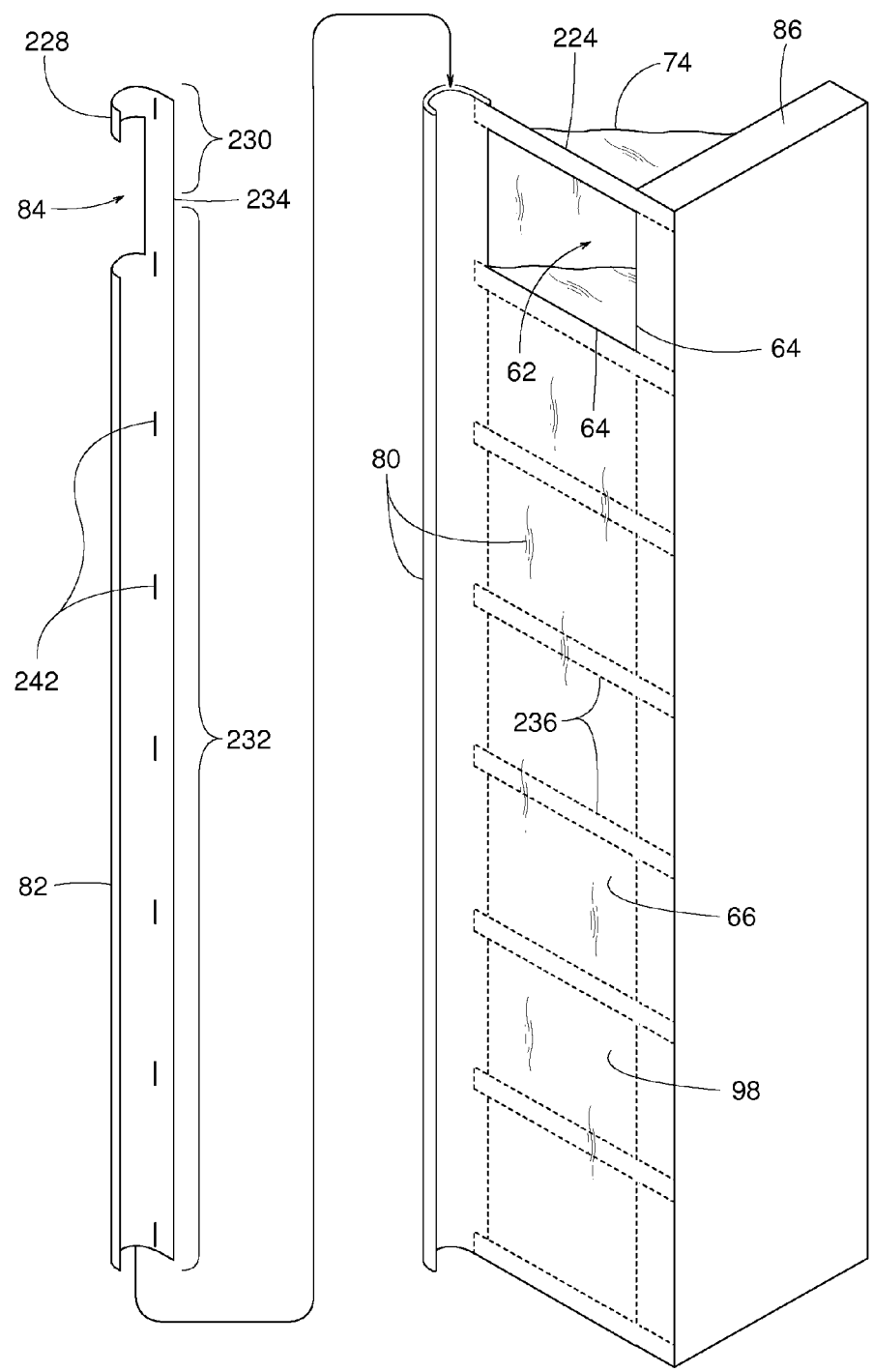
FIG. 54 is an exploded perspective view of an example side structure with an example seal core constructed in accordance with the teachings disclosed herein.
Figure 55:
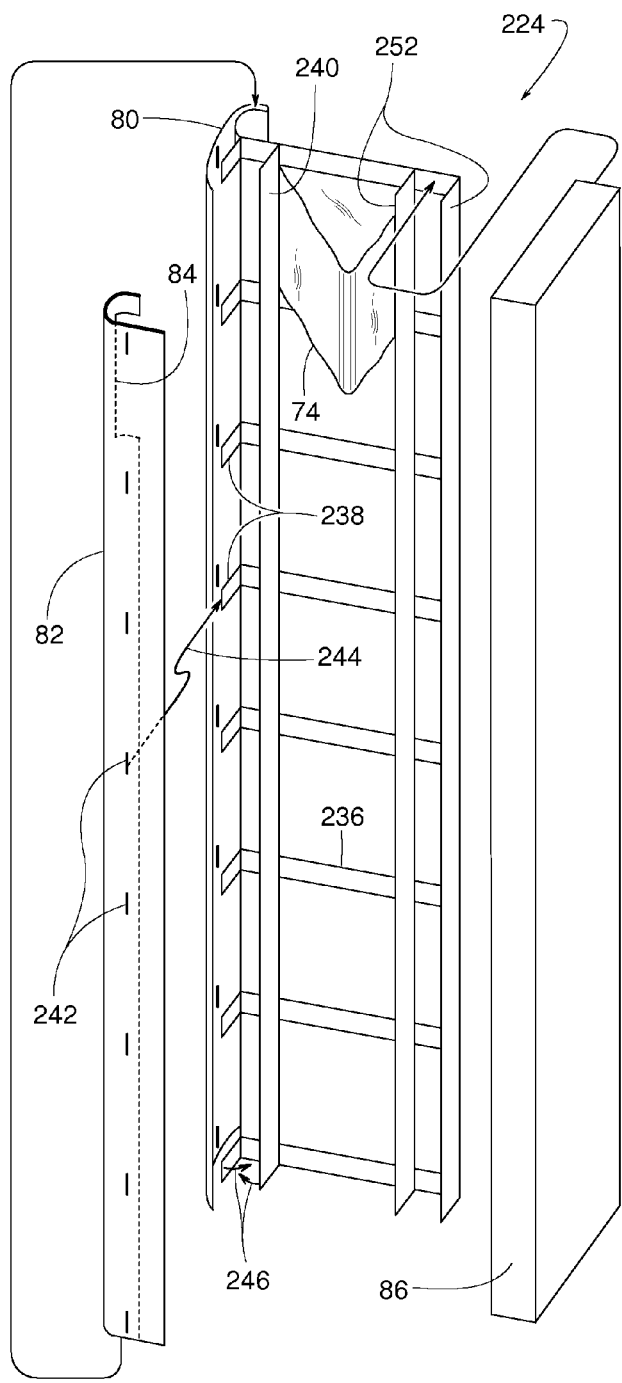
FIG. 55 is an exploded perspective view of another example side structure with another example seal core constructed in accordance with the teachings disclosed herein.
Figure 56:
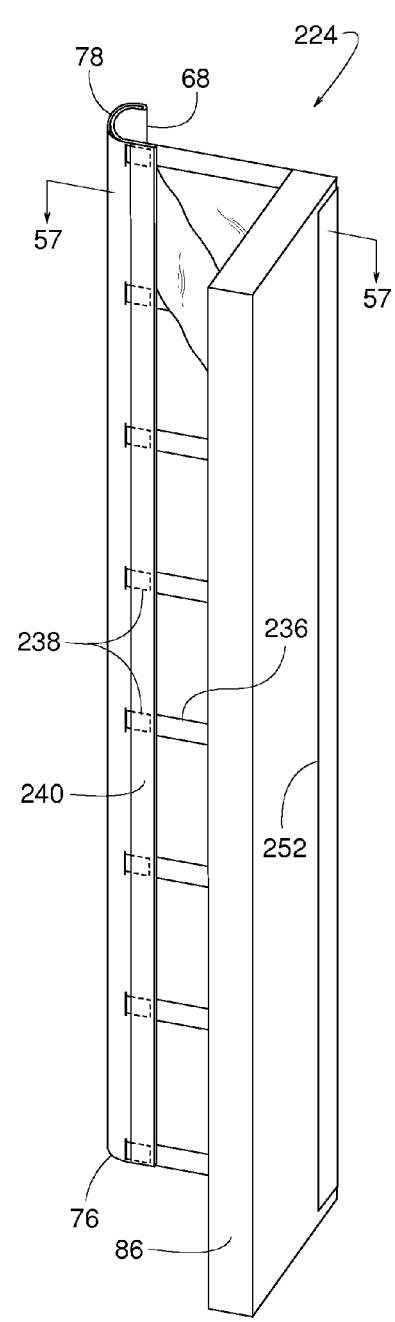
FIG. 56 is a perspective view of the example side structure shown in FIG. 55 but showing the side structure assembled.

FIGS. 50-62 show example hook-style rear edge seals that can be used with various header structures or side structures including, but not limited to, the examples shown in FIGS. 1-49 and 63-66. FIGS. 50-56, for instance, show an example side seal member 224 with hook-style rear edge seal 68 being used with header structure 151 (FIGS. 32 and 33) to provide an example weather barrier apparatus 226. FIGS. 50 and 52 show weather barrier apparatus 226 in the relaxed configuration, FIGS. 51 and 53 show weather barrier apparatus 226 in an activated configuration, FIG. 54 is an exploded view showing example core 82 about to be inserted within cover 80, FIG. 55 is an exploded view showing seal core 82 about to be inserted within seal cover 80 and side support member 86 about to be attached to side seal member 224, and FIG. 56 is a perspective view of side seal member 224 attached to side support member 86.

As mentioned earlier, the hook profile allows rear edge seal 68 to wrap around and seal against the vehicle's vertical rear edge 38a while, in some examples, seal core 82 includes a notch or gap 84 that provides clearance for the vehicle's upper rear edge 32. Seal cover 80 spans gap 84 and is sufficiently pliable to conform and seal around the vehicle's upper rear edge 32 in the area of gap 84. A projection 228 at the very top of the hook is positioned above the top of the tallest anticipated vehicle, and the vehicle's upper rear edge 32 projects into gap 84.

Although the actual construction, assembly and other design details may vary, in some examples, the hook's core 82 is made of a flexible material that is stiffer than cover 80. Example materials of seal core 82 include, but are not limited to, 1/16"-1/8" thick UHMW (ultra high molecular weight polyethylene), other plastics, materials of other thicknesses, spring steel, and various combinations of materials. In some examples, as shown in FIG. 54, seal core 82 includes an upper section 230 and a lower section 232 that are an integral extension of each other, whereby seal core 82 is a unitary piece, and gap 84 is a notch at an interface 234 between sections 230 and 232. Example materials of seal cover 80 include, but are not limited to, 22-once or 44-once vinyl coated fabric, nylon fabric, polyester fabric, non-fabric plastic sheeting, etc.

In some examples, cover 80 wraps around core 82 and extends across a plurality of flexible stays 236 to provide side seal member 224 with front panel 66 with front surface 98 (FIG. 54). Stays 236 help support the more flexible cover 80 and provide front panel 66 with resilience. Example materials of stays 236 include, but are not limited to, fiberglass and spring steel.

To hold core 82 within cover 80, some examples of side seal member 224 have a plurality of connecting tabs 238 and a mating connecting strip 240 that overlap to close cover 80 and hold core 82 in place. In some examples, tabs 238 and strip 240 are made of mating touch-and-hold fastener elements, such as VELCRO, which is a registered trademark of Velcro Industries, of Manchester, N.H. Referring to FIG. 55, to assemble core 82 and cover 80, tabs 238 insert through a plurality of slots 242 in core 82, as indicated by arrow 244, and strip 240 folds over onto and connects to tabs 238, as indicated by arrows 246.

Figure 57:
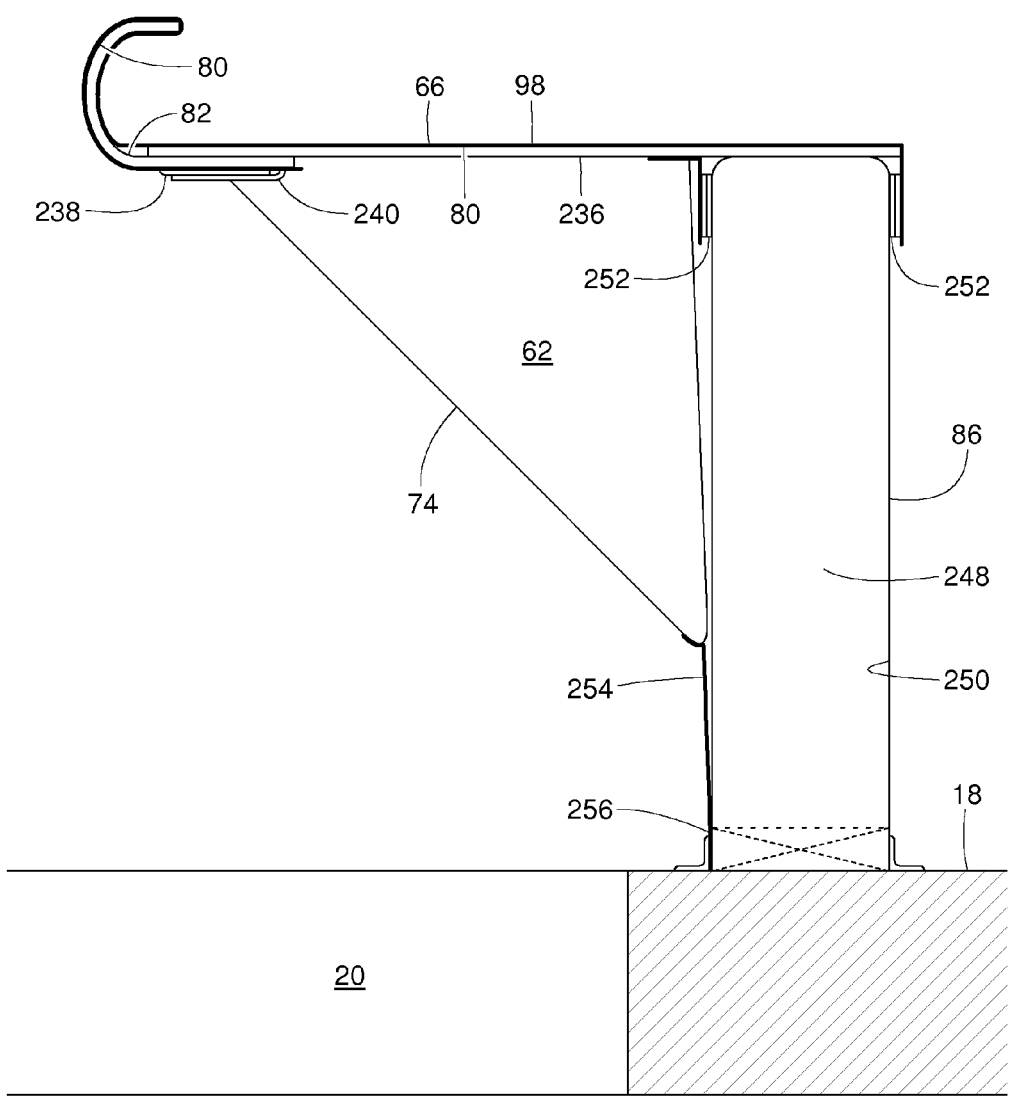
FIG. 57 is a cross-sectional view taken along line 57-57 of FIG. 56.

Side seal member 224 can be attached to any suitable side support member including, but not limited to, side support member 86. In some examples, as shown in FIG. 57, side support member 86 includes a resiliently compressible foam core 248 (e.g., polyurethane foam) encased within a pliable cover 250 (e.g., 22-once or 44-once vinyl coated fabric, nylon fabric, polyester fabric, non-fabric plastic sheeting, etc.). FIGS. 50-53 and 57 show side support member 86 attached to wall 18. In some examples, touch-and-hold fasteners 252 connect side seal member 224 to side support member 86.

In the example shown in FIGS. 50-57, weather barrier apparatus 226 includes optional back sheet 74 for enclosing header-receiving chamber 62. Back sheet 74 can be of any shape, size and material. Some example materials of back sheet 74 include, but are not limited to, 22-once or 44-once vinyl coated fabric, nylon fabric, polyester fabric, non-fabric plastic sheeting, etc. Back sheet 74 can be attached and optionally supported by any suitable means. One example of such means includes, but is not limited to, a strap 254 (FIGS. 7 and 57) connecting back sheet 74 to some convenient point 256 on cover 250 and/or on wall 18. In some examples, strap 254 is omitted and portions of back sheet 74 are left generally unsupported. In some examples, back sheet 74 is supported by header structure 151. In some examples back sheet 74 is attached directly to cover 250. In some examples, a portion of cover 250 serves as part of back sheet 74, whereby that portion of cover 250 helps enclose chamber 62.

Figure 58:
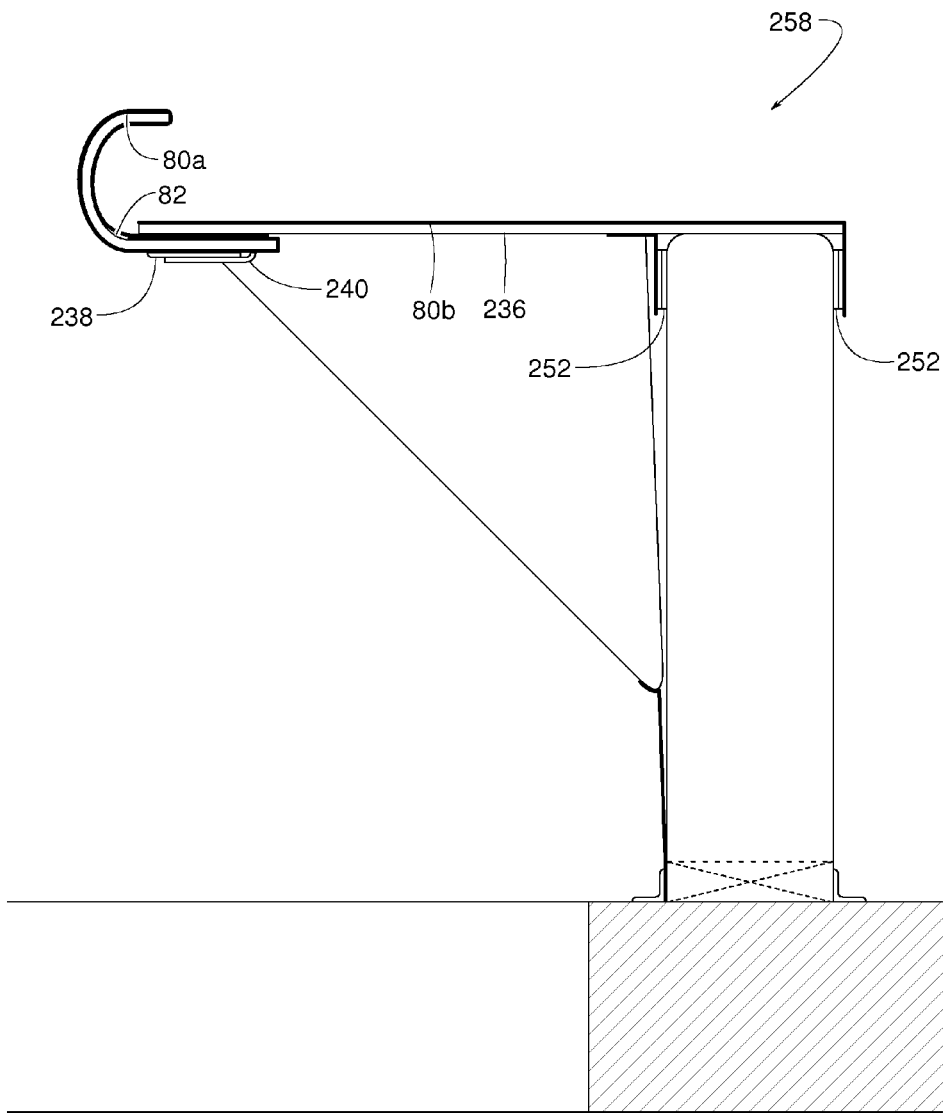
FIG. 58 is a cross-sectional view similar to FIG. 57 but showing another example of a side structure constructed in accordance with the teachings disclosed herein.

As an alternative to cover 80 being a single sheet covering both core 82 and the rest of side seal member 224, FIG. 58 shows an example weather barrier apparatus 258 including a first cover 80a encasing core 82 and a second cover 80b overlying stays 236. Tabs 238 and strip 240 hold core 82 and first cover 80a to stays 236 and second cover 80b. This allows future replacement of core 82 and first cover 80a without having to replace second cover 80b. Also, second cover 80b can be replaced without having to replace first cover 80a. In some examples, weather barrier apparatus of FIG. 57 is retrofitted to create weather barrier apparatus 258 of FIG. 58. In some examples, such a retrofit involves cutting cover 80 to create second cover 80b and adding a new first cover 80a.

Figure 59:
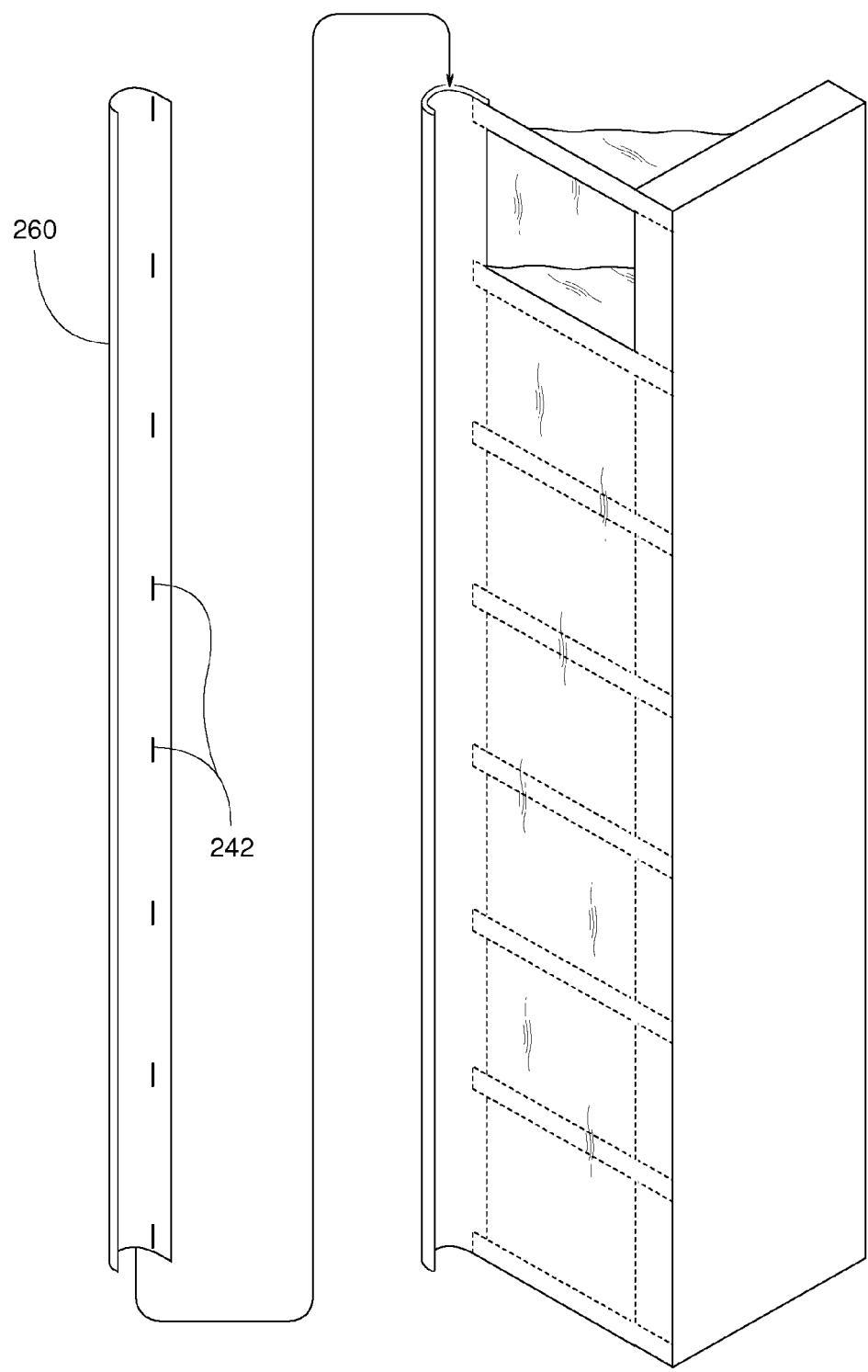
FIG. 59 is an exploded perspective view similar to FIG. 54 but showing an alternate example of a seal core constructed in accordance with the teachings disclosed herein.
Figure 60:
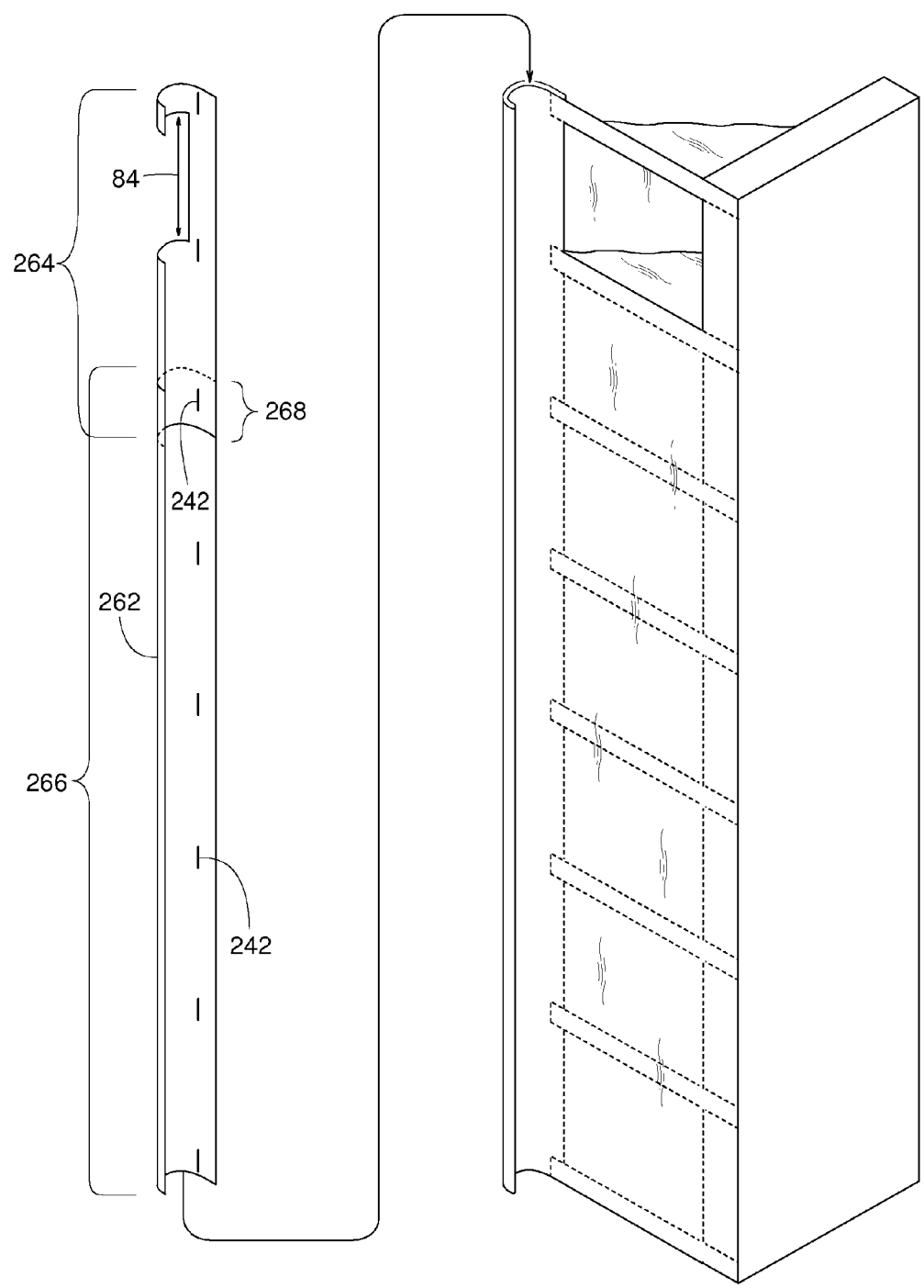
FIG. 60 is an exploded perspective view similar to FIG. 54 but showing another example of a seal core constructed in accordance with the teachings disclosed herein.

FIGS. 59-62 show examples of alternate rear edge seal cores. FIG. 59 shows an example core 260 without gap 84. In some examples, instead of fabricating and stocking various length full height hook cores with its accompanying notch in both left and right hand versions, more economical hook cores include an assembly of upper and lower sections. The lower section, in some examples, is of a standard size and can be used in both left and right applications. The upper section, in some examples, includes the notch or gap 84 and is right/left hand specific. To minimize the number of different parts needed to be stocked, the upper and lower sections, in some examples, are overlapped to various degrees and joined to make various lengths. In some examples, both upper and lower ends of a hook core have a notch or gap that makes the hook core reversible for both left and right hand versions. FIG. 60, for example, shows a hook core 262 including an upper section 264 fitted to a lower section 266, with some overlap 268 where sections 264 and 266 come together. Upper section 264 includes gap 84 while lower section 266 can be cut to any desired length. As shown in the illustrated example of FIG. 60, corresponding slots 242 in each of the sections 264, 266 are aligned within the area of overlap 268 to facilitate assembly of the example side structure.

Figure 61:
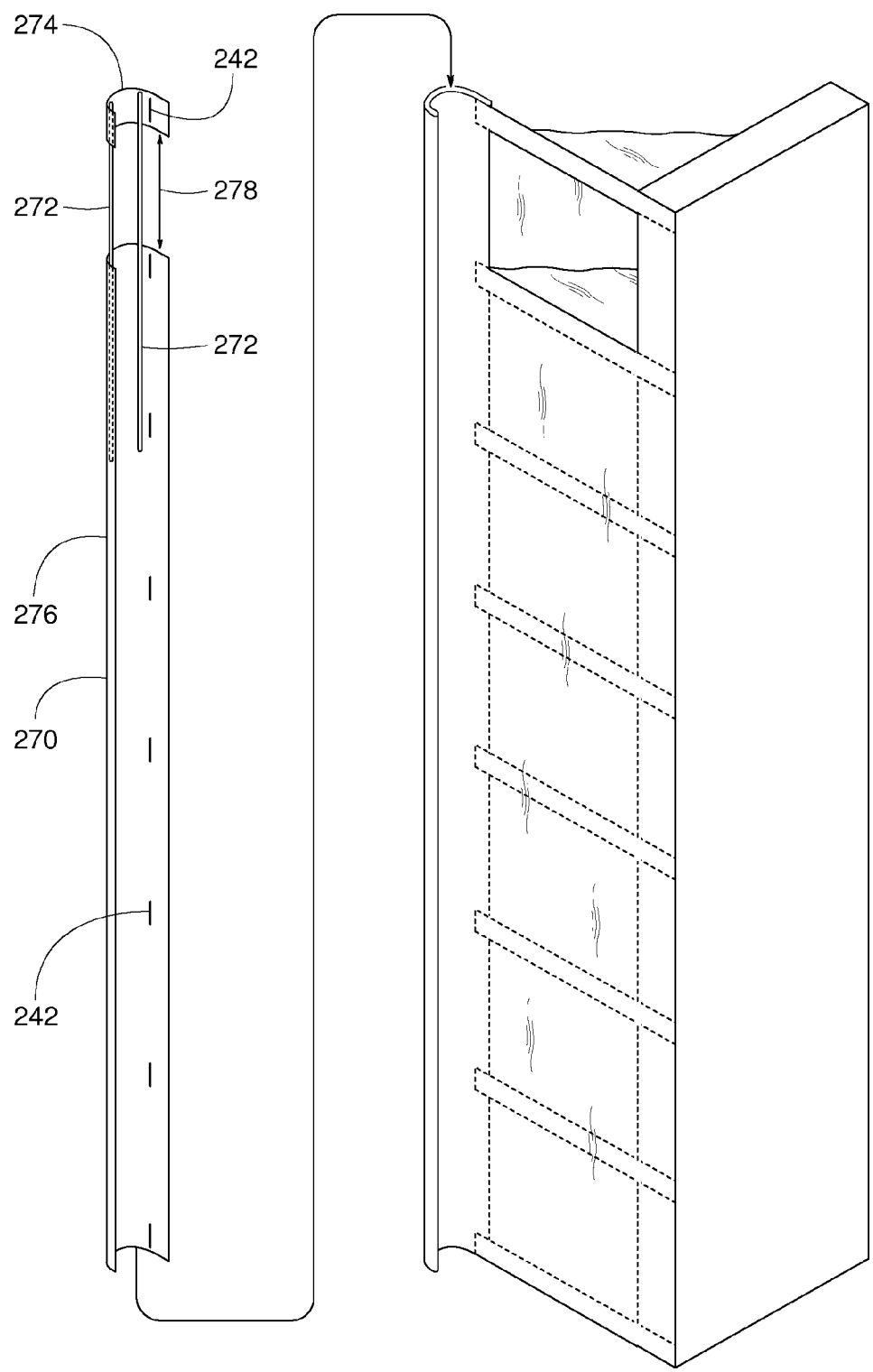
FIG. 61 is an exploded perspective view similar to FIG. 54 but showing another example of a seal core constructed in accordance with the teachings disclosed herein.

FIG. 61 shows an example core 270 including one or more connectors 272 that connect an upper section 274 to a lower section 276. Sections 274 and 276 are spaced apart to create a gap 278 between them. Connectors 272 can be of any suitable quantity (e.g., one, two or more), any suitable profile (e.g., round, flat, rectangular, tubular, channel, etc.) and any suitable material (e.g., fiberglass, steel, etc.). FIG. 62 shows an example core 280 including a plurality of hook pieces 282 interconnected by one or more connectors, such as connectors 284 and 286. The upper two hook pieces 282 are spaced apart to create a gap 288 between them. Connectors 284 and 286 can be of any suitable quantity (e.g., one, two or more), any suitable profile (e.g., round, flat, rectangular, tubular, channel, etc.) and any suitable material (e.g., fiberglass, steel, etc.). In some examples, the length of the gaps 278, 288 in FIGS. 61 and 62 are such that the slots 242 align with the tabs 238 described above in connection with FIGS. 54-58.

Figure 63:
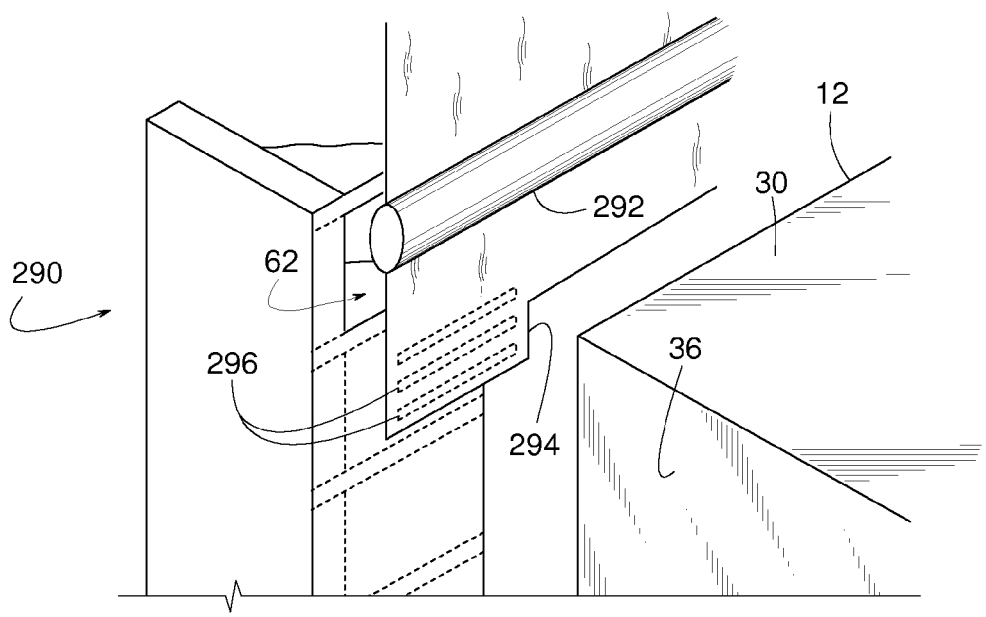
FIG. 63 is a perspective view similar to FIG. 22 but showing another example weather barrier apparatus with an example cover constructed in accordance with the teachings disclosed herein.

FIG. 63 shows an example weather barrier apparatus 290, wherein an example upper seal member 292 has a cover 294 with a series of stays or stiffeners 296 that help keep cover 294 stiff when seal member 292 is in the chamber 62 to cover the opening of the chamber.

Figure 64:
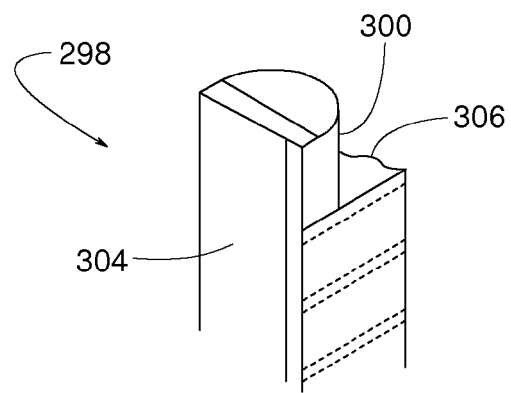
FIG. 64 is a perspective view similar to FIG. 14 but showing another example weather barrier apparatus with an example cover constructed in accordance with the teachings disclosed herein.
Figure 65:
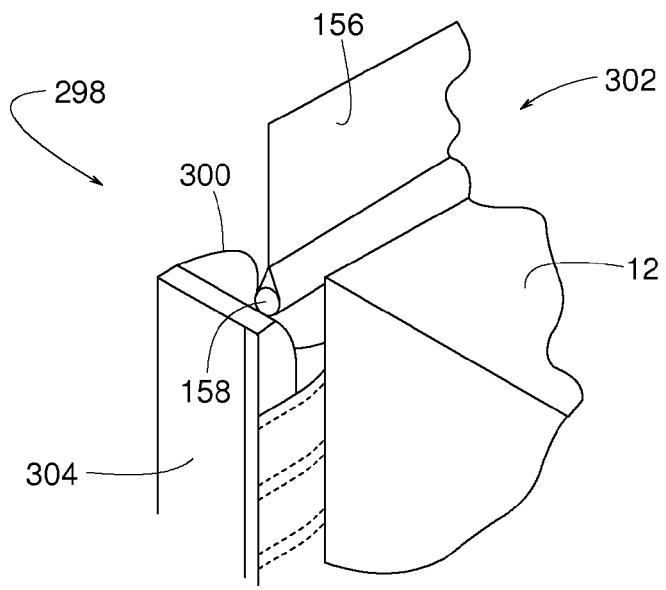
FIG. 65 is a perspective view of a vehicle backing into the example weather barrier apparatus shown in FIG. 64.
Figure 66:
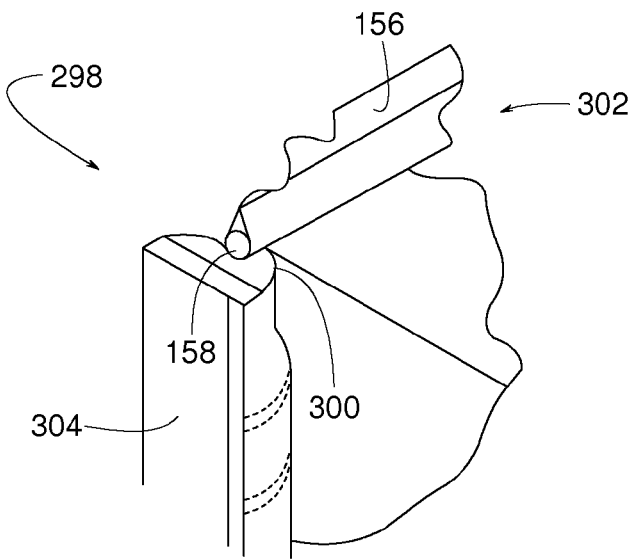
FIG. 66 is a perspective view of a vehicle backing farther into the example weather barrier apparatus shown in FIGS. 64 and 65.

FIGS. 64-66 show an example weather barrier apparatus 298 with an example upper seal member 302 including sheet 156 and cylinder 158. Weather barrier apparatus 298 also includes an example side structure 304 with a deformable cover 300. In some examples, when the cover 300 is engaged by the upper seal member 302, the cover 300 deforms locally and allows room for upper seal member 302. Some examples of cover 300 have upper and/or lower endcaps to enclose it. Some examples of cover 300 do not have endcaps. Some examples of cover 300 create somewhat of a "bubble" that in some examples is filled with foam. Some examples of cover 300 are hollow and biased to resist movement. Some examples have an extra sealing flap 306 that helps seal from underneath. FIG. 65 shows cover 300 moving out of the way as a lower portion of upper seal member 302 (e.g., cylinder 158) penetrates side structure 304. FIG. 66 shows cover 300 having moved forward after the lower portion of upper seal member 302 further penetrates side structure 304. FIG. 66 also shows cover 300 sealing sides of vehicle 12 and underneath upper seal member 302.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A weather barrier apparatus comprising:
    a side support member attachable to a wall proximate a doorway, the side support member being generally vertically elongate;
    a side seal member to extend from the side support member, the side seal member to extend laterally farther toward a center of the doorway when the weather barrier apparatus is in a relaxed condition than when the weather barrier apparatus is in an activated configuration; and
    a rear edge seal to be supported by the side seal member, the rear edge seal to be adapted to engage a first rear edge of a vehicle when the weather barrier apparatus is in the activated configuration, the rear edge seal to be generally vertically elongate from a lower end of the rear edge seal to an upper end of the rear edge seal, the rear edge seal having a seal core and a seal cover, the seal core being more rigid than the seal cover, the seal core to define a gap proximate the upper end of the rear edge seal, the seal cover to overlie the seal core and spanning the gap.

2. The weather barrier apparatus of claim 1, wherein the seal core includes an upper section and a lower section.

3. The weather barrier apparatus of claim 2, wherein the gap is to be positioned between the upper section and the lower section.

4. The weather barrier apparatus of claim 2, wherein the seal cover is to overlie the upper section and the lower section.

5. The weather barrier apparatus of claim 2, wherein the upper section is an integral extension of the lower section, and the gap comprises a notch at an interface between the upper section and the lower section.

6. The weather barrier apparatus of claim 2, wherein the weather barrier apparatus comprises a connector to connect the upper section to the lower section, the upper section being spaced apart from the lower section when the upper and lower sections are coupled via the connector.

7. A weather barrier apparatus comprising:
   a side support member attachable to a wall proximate a doorway;
   a side seal member to extend from the side support member; and
   a rear edge seal to be supported by the side seal member, the rear edge seal to engage a first rear edge of a vehicle, the rear edge seal having a seal core and a seal cover, the core having a gap defined by a first portion of the seal core and a second portion of the seal core, the gap being proximate an upper end of the rear edge seal to provide clearance for an upper portion of the first rear edge of the vehicle when the weather barrier apparatus is being engaged by the vehicle.

8. The weather barrier apparatus of claim 7, wherein the rear edge seal is to be generally vertically elongate from a lower end of the rear edge seal to an upper end of the rear edge seal.

9. The weather barrier apparatus of claim 7, wherein the seal core is composed of a flexible material, the flexible material being more rigid than a material of the seal cover.

10. The weather barrier apparatus of claim 7, wherein the core is to be inserted within the cover.

11. The weather barrier apparatus of claim 7, wherein the seal cover is to overlie the seal core and covers the gap.

12. The weather barrier apparatus of claim 7, wherein the side seal member is to extend laterally farther into a cargo passageway toward a center of the doorway when the weather barrier apparatus is in a non-deflected position than when the weather barrier apparatus is in a deflected position.

13. The weather barrier apparatus of claim 7, wherein the rear edge seal comprises a hook profile.

14. The weather barrier apparatus of claim 7, wherein the gap is positioned at an interface between the first and second portions.

15. The weather barrier apparatus of claim 7, further comprising a connector to couple the first portion and the second portion.

16. The weather barrier apparatus of claim 15, wherein the first portion has a height that is greater than a height of the second portion.

17. The weather barrier apparatus of claim 7, wherein the seal core includes a plurality of hooks interconnected by a connector, wherein a first hook and a second hook from the plurality of hooks are spaced apart to create the gap.

18. A weather barrier apparatus comprising
   a side support member attachable to a wall proximate a doorway;
   a side seal member to couple to the side support member;
   a rear edge seal coupled to a lateral edge of the side seal member, the rear edge seal having a hook profile to engage a first rear edge of a vehicle, the rear edge seal having a gap formed between a first portion of the rear edge seal and a second portion of the rear edge seal, the first portion being a separate piece from the second portion; and
   a connector to couple the first portion and the second portion, the first portion being spaced apart from the second portion via the connector to define the gap.

19. The weather barrier apparatus of claim 18, wherein the connector has a first end coupled to the first portion and a second end coupled to the second portion.

20. The weather barrier apparatus of claim 18, wherein the connector positions the first portion relative to the second portion to define the gap.

* * * * *